(12) United States Patent
Crockett et al.

(10) Patent No.: US 8,744,247 B2
(45) Date of Patent: Jun. 3, 2014

(54) UPSTREAM QUALITY ENHANCEMENT SIGNAL PROCESSING FOR RESOURCE CONSTRAINED CLIENT DEVICES

(75) Inventors: Brett G. Crockett, Brisbane, CA (US); Charles Q. Robinson, Piedmont, CA (US); Claus Bauer, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 485 days.

(21) Appl. No.: 13/050,834

(22) Filed: Mar. 17, 2011

(65) Prior Publication Data

US 2011/0164855 A1    Jul. 7, 2011

Related U.S. Application Data

(63) Continuation of application No. PCT/US2009/055825, filed on Sep. 3, 2009.

(60) Provisional application No. 61/098,481, filed on Sep. 19, 2008.

(51) Int. Cl.
*H04N 5/91* (2006.01)
*H04N 5/76* (2006.01)
*G10L 21/02* (2013.01)

(52) U.S. Cl.
CPC ........................................ *G10L 21/02* (2013.01)
USPC ............................................ 386/338; 386/285

(58) Field of Classification Search
USPC .................... 386/285, 248, 353, 338
See application file for complete search history.

(56) References Cited

U.S. PATENT DOCUMENTS

| 5,802,467 | A | 9/1998 | Salazar |
|---|---|---|---|
| 6,891,672 | B2 | 5/2005 | Whitehead |
| 2002/0059460 | A1 | 5/2002 | Ishida et al. |
| 2004/0044525 | A1 | 3/2004 | Vinton et al. |
| 2004/0165730 | A1 | 8/2004 | Crockett |
| 2006/0002572 | A1 | 1/2006 | Smithers et al. |
| 2007/0092089 | A1 | 4/2007 | Seefeldt et al. |
| 2007/0291959 | A1 | 12/2007 | Seefeldt |
| 2008/0033732 | A1 | 2/2008 | Seefeldt et al. |

(Continued)

FOREIGN PATENT DOCUMENTS

| EP | 1191783 | 3/2002 |
|---|---|---|
| JP | 10341201 | 12/1998 |

(Continued)

OTHER PUBLICATIONS

Office Action on Japan Patent Application No. 2011-527869 mailed Oct. 16, 2012 (English translation included).

(Continued)

*Primary Examiner* — Robert Chevalier
(74) *Attorney, Agent, or Firm* — Don Rosenfeld; Inventek

(57) ABSTRACT

Methods, apparatuses and program logic in storage media to process media data for quality enhancement. Information is accepted from a resource constrained device, e.g., a wireless portable device related to the quality enhancement and/or environmental quantities such as background noise and/or ambient lighting for the device. Media data is data processed to achieve quality enhancement using at least some of the accepted information to generate processed output. The data processing of the media data includes processing when or where one or more resources sufficient for the processing are available.

35 Claims, 15 Drawing Sheets

(56) References Cited

U.S. PATENT DOCUMENTS

| | | | |
|---|---|---|---|
| 2008/0036591 A1 | 2/2008 | Ray | |
| 2008/0097750 A1 | 4/2008 | Seefeldt et al. | |
| 2010/0062713 A1* | 3/2010 | Blamey et al. | 455/41.3 |

FOREIGN PATENT DOCUMENTS

| | | |
|---|---|---|
| JP | 2002223268 | 8/2002 |
| JP | 2004104245 | 4/2004 |
| JP | 2004173173 | 6/2004 |
| JP | 2004350214 | 12/2004 |
| TW | 564372 | 12/2003 |
| TW | I269565 | 12/2006 |
| WO | 9914983 | 3/1999 |
| WO | 9949574 | 9/1999 |
| WO | 0227985 | 4/2002 |
| WO | 2004/111994 | 12/2004 |
| WO | 2005094060 | 10/2005 |
| WO | 2005125099 | 12/2005 |
| WO | 2006/047600 | 5/2006 |
| WO | WO 2007/016107 | 2/2007 |
| WO | 2007/120453 | 10/2007 |
| WO | WO 2007/120452 | 10/2007 |
| WO | WO 2007/123608 | 11/2007 |
| WO | WO 2007/127023 | 11/2007 |
| WO | 2008058327 | 5/2008 |

OTHER PUBLICATIONS

S.J. Elliott and P.A. Nelson, "Active Noise Control," *IEEE Signal Processing Magazine*, Oct. 1993, pp. 12-35.

Sen M. Kuo and Dennis R. Morgan, "Active Noise Control: A Tutorial Review," Proceedings of the IEEE, vol. 87, No. 6, Jun. 1999, pp. 943-973.

Bernard Widrow et al, "Adaptive Noise Cancelling: Principles and Applications," Proceedings of the IEEE, vol. 63, No. 12, Dec. 1975, pp. 1692-1716.

International Preliminary Report on Patentability for PCT Application PCT/US2009/055835 mailed Dec. 23, 2010.

International Search Report and Written Opinion for PCT Application PCT/US2009/055835 mailed Dec. 4, 2010.

Office Action on China Patent Application No. 200980136525.5 mailed Dec. 19, 2012 (English translation included).

Office Action on China Patent Application No. 200980136525.5 mailed Mar. 7, 2012 (English translation included).

Office Action and Search Report on Taiwan Patent Application No. 098130083 mailed May 3, 2013 (English translation included).

Seefeldt, Alan "Loudness Domain Signal Processing" presented at the AES 123rd Convention Oct. 5-8, 2007 New York, NY, pp. 1-15.

Seetzen, et al., "High Dynamic Range Display Systems" ACM Transactions on Graphics, vol. 23, Issue 3, Special Issue: Proceedings of the 2004 SIGGRAPH Conference (Aug. 2004).

"Bandwidth_extension," from Wikipedia, retrieved Jun. 2, 2008 at http://en.wikipedia.org/wiki/Bandwidth_extension.

Oliver Kunz, "SBR explained: White paper," retrieved Jun. 2, 2008 at http://www.codingtechnologies.com/products/assets/SBR_White_Paper_v1.pdf.

International Preliminary Report on Patentability for PCT Application PCT/US2009/055825 mailed Sep. 24, 2010.

International Search Report and Written Opinion for PCT Application PCT/US2009/055825 mailed Dec. 29, 2009.

Office Action and Search Report on Taiwan Patent Application No. 098130082 mailed Apr. 2, 2013 (English translation included).

Office Action on China Patent Application No. 200980136525.5 mailed Jul. 30, 2012 (English translation included).

\* cited by examiner

UPSTREAM QUALITY ENHANCEMENT SIGNAL PROCESSING FOR RESOURCE CONSTRAINED CLIENT DEVICES

CROSS-REFERENCE TO RELATED APPLICATIONS

This application is a continuation of International Application No. PCT/US2009/055825 filed 3 Sep. 2009. International Application No. PCT/US2009/055825 claims priority to U.S. Patent Provisional Application No. 61/098,481, filed 19 Sep. 2008. Both International Application No. PCT/US2009/055825 and U.S. Application No. 61/098,481 are hereby incorporated by reference in their entirety.

FIELD OF THE INVENTION

The present disclosure relates generally to signal processing of media data, such as signal processing of streaming audio data for quality enhancement.

BACKGROUND

Portable devices continue to grow in popularity and functionality. Such increasingly popular devices include media players such as Apple's iPod, cellular telephones, wireless IP-based telephones such as devices made Helio, Linksys, etc., wireless network compatible multimedia devices such as Microsoft Zune, Apple iPhone, etc., portable gaming consoles such as Sony PSP, Nokia N Gage, etc., and many other devices that can be used to send, receive, and/or render communications and/or multimedia data. Such devices typically include a processing system, such as a digital signal processor (DSP) or microcontroller, and memory that stores program logic (software). While portable devices continue to improve in processing power and functionality, and/or extended battery life, these devices still have limited signal processing capabilities and/or other resources compared to non-portable processing systems such as computers, network adaptors and routers, and/or fixed core network devices. Typically, portable devices are preferably small, preferably inexpensive, have limited processing capabilities, limited memory resources and/or have limited battery power.

In stark contrast, fixed processing systems that portable devices communicate with, such as server computer systems, network adaptors and routers, wireless base stations and access points, and fixed core network devices, have significantly greater signal processing capabilities. Such fixed systems can be large and do not operate off batteries. Thus, fixed systems typically feature high speed processing capabilities, much larger memory capabilities than portable devices, and virtually unlimited access to electrical power.

In general, a device such as a portable device that has limited resource(s) compared to a fixed processing system, is called a limited resource device herein.

There are known media data quality enhancement methods that require expensive signal processing that, if implemented on a limited resource device, might require too much electric power, thus draining any battery used, and/or that might overtax the limited signal processing power available.

EP1191783A2 describes a system for transmitting image data from a server via a network to a cellular phone. WO2008/058327 describes a small battery-operated headset device which, via a wireless data connection, operates in conjunction with a nearby device such as a mobile or cellular telephone. WO20051125099 describes a method for enhancing the quality of service concerning multimedia data such as video.

DESCRIPTION OF EXAMPLE EMBODIMENTS

Overview

Figure 1A:
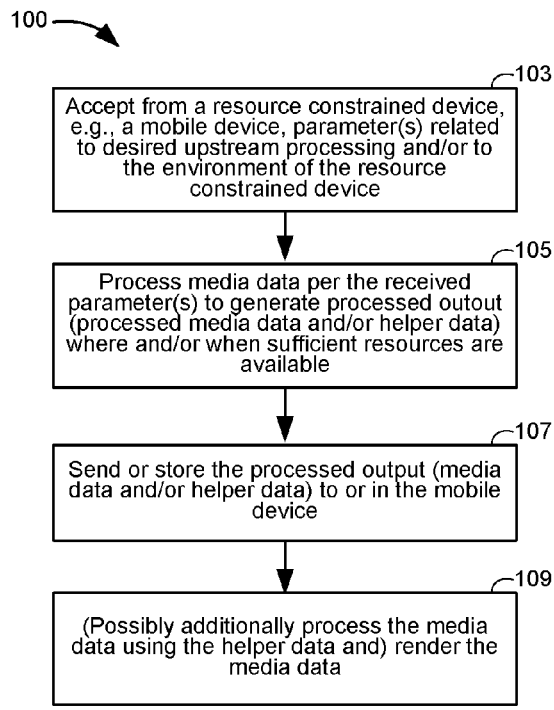
FIG. 1A shows a simplified flowchart of describing some method embodiments of the invention.

Embodiments of the present invention include a method, an apparatus, and program logic encoded in one or more computer-readable tangible medium to carry out a method. The method is to carry out quality enhancement signal processing on media data using one or more parameters gathered at a resource constrained device to generate processed output for use by the resource constrained device to render the media data.

Particular embodiments of the invention include a method of processing media data for quality enhancement using processing hardware. The method comprises accepting information from a resource constrained device related to processing media data for quality enhancement, the media data being for rendering by the resource constrained device, and data processing the media data to achieve quality enhancement using at least some of the accepted information to generate processed output. The data processing of the media data is when or where resources, e.g., electric power and/or processing power sufficient for the processing are available. The processed output is usable by the resource constrained device to render the media data, or to both carry out some processing of the media data and to render media data. The information related to quality enhancement processing includes information obtained at the resource constrained device, and includes a set of one or more parameters related to the desired processing of the media data—such parameters called metadata herein—and/or one or more parameters related to the environment of the resource constrained device—such parameters called environmental quantities herein.

In some embodiments of the method, the processed output includes processed media for rendering by the resource constrained device.

In some embodiments of the method in which some media data processing occurs at the resource constrained device, the processed output includes helper data for use by the resource constrained device for the media data media data processing at the at the resource constrained device.

In some embodiments of the method, the processing uses at least one of the metadata and/or environmental quantities to generate processed output that includes processed media for rendering by the resource constrained device. In some implementations, the processing of the media data is prior to rendering of the processed media data on the resource constrained device.

In some embodiments, called two-way streaming embodiments herein, the media data includes audio data interactively streamed across a network to the resource constrained device as part of two-way communication with the resource constrained device. Examples of two-way streaming embodiments include these wherein the quality enhancement processing of the media data includes one or both of equalization processing and/or dialog clarity enhancement.

An overview of some embodiments of the method that use metadata and/or environmental quantities generated at the resource constrained device are now summarized.

In some particular embodiments wherein the processed output includes processed media for rendering, the method includes sending the processed output to the resource constrained device, or storing the processed output for use by the resource constrained device. The data processing of the media data is where resources sufficient for the processing are available, and is prior to rendering of the processed media data on the resource constrained device. Examples include the media data including one or more of:

- Media data streamed or broadcast to the resource constrained device.
- Media data interactively streamed across a network to the resource constrained device as part of two-way communication with the resource constrained device.
- Media data originating at or generated by resource constrained device for rendering by the resource constrained device.

Some embodiments wherein the processed output includes processed media for rendering are for real time streaming. That is, the method includes sending the processed output to the resource constrained device, or storing the processed output for use by the resource constrained device, and the media data includes media data streamed or broadcast to the resource constrained device. Such embodiments are called streaming embodiments herein.

For such streaming embodiments, the invention is not limited to the type of data, e.g., whether it is audio, video, and both audio and video, and further, the invention is not limited as to the type of quality enhancement processing that uses the metadata and/or environmental quantities. Many enhancement methods are known.

In some streaming embodiments in which the media data includes audio data, and the quality enhancement processing of the audio data includes loudness leveling—also called loudness compensated leveling—according to one or more items of metadata, such metadata including one or more loudness level parameters. In some versions, such loudness leveling includes 1) generating modification parameters using the loudness level parameters, such generating of modification parameters including carrying out operations on information in a perceptual loudness domain, and 2) modifying the audio data based upon the modification parameters to generate processed audio data. Examples of loudness level parameters include a reference reproduction level, a desired reproduction level and/or a leveling amount.

With such leveling, some embodiments include dynamic equalization so that the processed output has a desired frequency profile, and/or includes automatic gain control (AGC) or dynamic range compression.

In some streaming embodiments in which the media data includes audio data, the quality enhancement processing includes audio spatialization according to one or more of the metadata. Such spatialization includes, for example, spatializing the audio data for playback via headphones, so that a listener has the perception of listening to audio being played back from a set of loudspeakers at a respective set of locations. Such spatializing might instead or in addition include upmixing: adding spatial spatializing channels, such as creating surround sound signals from stereo audio signals.

In other streaming embodiments, the media data includes video, and the quality enhancement processing of the media data includes one or more of noise filtering, contrast enhancement, and/or color compensation.

Particular streaming embodiments include those in which the one or more parameters include one or more environmental quantities, one or more parameters related to the environment of the resource constrained device.

In some streaming embodiments that use one or more environmental quantities, the media data includes audio data, and at least one environmental quantity is indicative of the acoustic noise profile in the environment. The quality enhancement processing using one or more of the parameters includes noise compensation. In some such embodiments, noise compensation includes generating modification parameters from the audio data using one or more loudness level parameters and the one or more environmental quantities indicative of the acoustic noise profile. The modification parameters are generated by carrying out operations on information in a perceptual loudness domain. The noise compensation includes modifying the audio data based upon the modification parameters to generate processed audio data. As examples, the loudness level parameters include: one or more of whether audio noise compensation is turned on, a reference level for the resource constrained device, a desired reproduction level, and/or a noise compensation amount. In some variants, the processing of the audio data further includes one or more of AGC, dynamic range compression and/or dynamic equalization applied to the audio data.

In some streaming embodiments that use one or more environmental quantities, the media data includes video media data streamed to the resource constrained device. The one or more environmental quantities include at least one parameter indicative of the lighting in the environment, and the quality enhancement processing includes modifying the contrast and/or brightness of the video data according to one or more of the received parameters.

In some such streaming video embodiments, the resource constrained device includes a flat panel display device that has location dependent backlighting elements each modulated according to image dependent modulation data sent to the resource constrained device with the video data. The data processing includes generating the image dependent modulation data according to one or more of the parameters.

In some of the above streaming audio and streaming video embodiments and examples, including those that include not only metadata being sent from the resource constrained device, but also one or more environmental quantities, the method further includes receiving the media data from the resource constrained device for the processing of the media data. That is, the media data is sent from the resource constrained device, processed, and sent to the resource constrained device, or stored for use by the resource constrained device. The processed output includes processed media for rendering by the resource constrained device.

In some such embodiments that include receiving media data from the resource constrained device, the processing of the media data is prior to rendering of the processed media data on the resource constrained device. The media data includes one or more of 1) media data streamed or broadcast to the resource constrained device, or 2) media data interactively streamed across a network to the resource constrained device as part of two-way communication with the resource constrained device, or 3) media data originating at or generated by resource constrained device for rendering by the resource constrained device.

Examples of quality enhancement processing for the cases of the media data including audio data streamed or broadcast to the resource constrained device, and wherein the one or more parameters are generated at the resource constrained device, the above described leveling, with or without one or more of AGC, dynamic range compression and/or dynamic equalization. Other examples include audio spatialization.

For interactive audio media, other examples of processing include one or both of equalization processing and/or dialog clarity enhancement.

Examples of quality enhancement processing for the cases of the media data including video data streamed or broadcast to the resource constrained device wherein the quality enhancement processing includes one or more of video noise filtering, contrast enhancement, and/or color compensation.

Examples of quality enhancement processing for the cases of the media data including audio data streamed or broadcast to the resource constrained device, and wherein the one or more parameters generated at the resource constrained device include at least one environmental quantity indicative of the noise profile in the environment of the device include noise compensation, with or without other processing such as AGC, dynamic range compression and/or dynamic equalization.

Examples of data processing for the cases of the media data including video data streamed or broadcast to the resource constrained device, and wherein the one or more parameters generated at the resource constrained device include at least one environmental quantity indicative of the lighting in the environment of the device, include generating image dependent modulation data for a flat panel display device that has location dependent backlighting elements each modulated according to the image dependent modulation data.

The above examples are for real time applications in which the data is streamed to the resource constrained device.

Some embodiments of the method of the invention include what we call "offline method embodiments." Some such embodiments are what we call "time shifting embodiments". In such time shifting embodiments, the metadata and/or one or more environmental quantities are obtained at the resource constrained device during a first time period, the data processing of the media data uses metadata and/or one or more environmental quantities and is during a second time period, e.g., that starts after the start of the first time period, and the rendering of the media data is at a third time period, e.g., that starts after the start of the second time period.

In some such time shifting embodiments, the processed output includes processed media for rendering by the resource constrained device and the method further includes receiving the information obtained at the resource constrained device; and sending the processed output to the resource constrained device for use by the resource constrained device.

One such time shifting embodiment example includes the case that the media data includes audio and that the information obtained at the resource constrained device includes metadata and/or one or more environmental quantities. In some such embodiments, the quality enhancement processing includes one or more of leveling and/or AGC and/or dynamic range compression and/or dynamic equalization. Other such embodiments include receiving at least one environmental quantity that is indicative of the acoustic noise profile in the environment of the device, and the quality enhancement processing including noise compensation, possibly with one or more of AGC, dynamic range compression and/or dynamic equalization.

In other such time shifting embodiments, the processing using one or more the parameters generates helper data for use by the resource constrained device for processing the media data. In these embodiments, the method further includes receiving the information obtained at the resource constrained device; and sending the processed output to the resource constrained device for use by the resource constrained device. The method might further include sending media data to the resource constrained device for rendering by the resource constrained device. The helper data is used by the resource constrained device for further processing the media data and/or for rendering the media data.

As an audio example, that is, suppose the media data includes audio data. One such example includes the case that the information obtained at the resource constrained device includes metadata. In some such embodiments, the quality enhancement processing includes one or more of leveling, AGC, dynamic range compression, and/or dynamic equalization. Other such embodiments include receiving at least one environmental quantity that is indicative of the acoustic noise profile in the environment of the device, and the quality enhancement processing including noise compensation, possibly with one or more of AGC, dynamic range compression, and/or dynamic equalization.

In yet other such time shifting embodiments, the processing of the media data is in the resource constrained device when one or more resources sufficient for the processing are available to the resource constrained device. One example is wherein the data processing of the media data is in the resource constrained device when sufficient electric power for the processing is available at the resource constrained device. Another, not mutually exclusive from the electric power case, is wherein the data processing of the media data is in the resource constrained device when processing power is available at the resource constrained device. The data processing using one or more the parameters generates helper data for use by the resource constrained device for processing the media data.

Particular embodiments include program logic that when executed by at least one processor of a processing system causes carrying out any one of the method embodiments described in this Overview Section. Such program logic, e.g., is embodied in a computer readable storage medium.

Particular embodiments include a computer readable medium having therein program logic that when executed by at least one processor of a processing system causes carrying out causes carrying out any one of the method embodiments described in this Overview Section.

Particular embodiments include an apparatus for carrying out at least part of quality enhancement processing of media data. The apparatus includes an interface configured to connect to a resource constrained device and to accept information from the resource constrained device related to quality enhancement processing of media data that is for rendering by the resource constrained device, and processing hardware configured to carry out data processing of the media data to achieve quality enhancement using at least some of the accepted information to generate processed output. The interface is further configured to send the processed output to the resource constrained device. The information related to quality enhancement processing includes information obtained at the resource constrained device, and includes a set of one or more parameters related to the desired processing of the media data or to the environment of the resource constrained device. The processing hardware carries out the data processing when or where one or more resources sufficient for the processing are available, such that the processed output is usable by the resource constrained device to render or to process and render the media data. Some embodiments of the apparatus are configured to carry out any one of the method embodiments described in this Overview Section.

Particular embodiments include an apparatus for carrying out at least part of quality enhancement processing of media data. The apparatus comprises a processing system including at least one processor, and a storage device. The storage device is configured with program logic that causes when executed the apparatus to carry out to carry out any one of the method embodiments described in this Overview Section.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Example embodiments are now described in more detail.
Examples of Some Audio Quality Enhancement Signal Processing Methods One advantageous feature of the invention is carrying out resource intensive quality enhancement signal processing upstream and offloaded from a client device, e.g., a portable device that is resource constrained.

The invention is not limited to the type of media quality enhancement processing that is carried out in the upstream. It is most advantageous for computationally intense media quality enhancement signal processing techniques that might overburden the processor(s) in a typical portable device and/or result is rapid drain in battery power. The following are some examples, not meant to be limiting, of media quality enhancement signal processing methods that can advantageously use one or more features of the present invention.
Processing in a Perceptual Loudness Domain Often, audio media data is expected to be reproduced at a specified reference level. However, many times, the media data is played back at reduced levels. It is known that there is variation in the perception of audio depending on the reproduction level. Such variation is related to psychoacoustics and the equal loudness contours and the threshold of hearing in quiet. Altered playback levels can result in dramatic differences in timbre and spatial perception of the audio when compared to the same media data played back at reference level. The quality enhancement signal processing for some embodiments of the invention include determining and adjusting the perceived loudness of an audio signal in an improved manner. A psychoacoustic model is used to calculate a measure of the loudness of an audio signal in perceptual units. Such perceptual domain loudness measure is referred to as specific loudness, and is a measure of perceptual loudness as a function of frequency and time. As one example, a volume control method using parameters determined in a perceptual domain includes using a signal processing method to compute a wideband multiplicative gain, which, when applied to the audio, results in the loudness of the gain-modified audio being substantially the same as a reference loudness. The gain adjusting methods include signal processing methods that analyze and modify the audio depending on playback level restoring it to the way it would be perceived at the reference playback level. This has been found to result in improved imaging, intelligibility and audibility of the audio media data. More details are presented below.
Volume Leveling (Dynamic Range Control and Automatic Gain Control)

Volume leveling, also called "loudness leveling" and "loudness compensated leveling," includes, inter alia, deriving information usable for controlling the specific loudness of an audio signal by modifying the audio signal in order to reduce the difference between its specific loudness and a target specific loudness. In practical implementations, the specific loudness of the modified audio signal may be made to approximate the target specific loudness. The approximation may be affected not only by ordinary signal processing considerations but also time- and/or frequency-smoothing that may be used in the modifying. The methods include determining the perceptual loudness of the audio signal in the form of the specific loudness of the audio signal, and determining multi-band gains to apply to multiple bands of the audio signal to modify the audio signal. In some embodiments, modifying of the signal dynamically applies multi-band gain modifications to the audio so that the perceived loudness of the audio media data remains consistent. This allows audio from multiple sources, such as different television channels, radio stations or songs, to have the same perceived loudness level. When such is used in conjunction with the volume control of an audio system, the volume controller is transformed and no longer emulates an electrical resistor that controls the audio signal level being sent to an amplification section. Instead the volume controller now provides input to the leveling method indicating the users desired perceived loudness reproduction level. This information is then used to modify the perceived loudness of reproduced audio to match that of the users desired loudness level. Details of leveling to achieve automatic gain control and dynamic range compressing are described in more detail below.

Dynamic Equalization (DEQ)

Unlike simple leveling, instead of altering the audio to match a user's desired perceived loudness level, dynamic equalization alters the audio to match a preset or user defined equalization or spectral balance profile. Because specific loudness is a measure of perceptual loudness of an audio signal as a function of frequency and time, in order to reduce the difference between the specific loudness of the audio signal and the target specific loudness, the modifying may modify the audio signal as a function of frequency. Although in some cases the target specific loudness may be time-invariant and the audio signal itself may be a steady-state time-invariant signal, typically, the modifying may also modify the audio signal as a function of time. In the case of a time- and frequency-varying scale factor, the specific loudness may be scaled by the ratio of a measure of a desired spectral shape to the measure of a spectral shape of the audio signal. Such a scaling may be used to transform the perceived spectrum of the audio signal from a time-varying perceived spectrum to a substantially time-invariant perceived spectrum. When the specific loudness is scaled by the ratio of a measure of a desired spectral shape to the measure of a spectral shape of the audio signal, such a scaling may be usable as a dynamic equalizer.

Noise Compensation—Leveling in the Presence of Noise Interference

In many audio playback environments there exists background noise that interferes with the audio that a listener wishes to hear. For example, a listener in a moving automobile may be playing music over the installed stereo system and noise from the engine and road may significantly alter the perception of the music. In particular, for parts of the spectrum in which the energy of the noise is significant relative to the energy of the music, the perceived loudness of the music is reduced. If the level of the noise is large enough, the music is completely masked. The quality enhancement signal processing in some embodiments of the present invention include a method to compensate for background noise interfering in an audio playback environment. The partial specific loudness of the audio is defined as the perceptual loudness of the audio in the presence of a secondary interfering sound signal, such as the noise. The signal processing in some embodiments includes determining information usable for controlling the partial specific loudness of an audio signal by modifying the audio signal in order to reduce the difference between its partial specific loudness and a target specific loudness. Doing so mitigates the effects of the noise in a perceptually accurate manner.

Spatialization and Binauralizing

Spatialization is an audio quality enhancement signal processing technique that provides a listener with the experience of listening to audio coming from a set of loudspeakers at some predetermined locations in a listening room, even if the listener is in fact listening to the audio media data with earphones, or with a simple set of stereo loudspeakers. As an example, binauralizing deals with technology simulating the sound of speakers that are clearly and unambiguously located outside the listener's head when listening through headphones. With conventional headphone listening, audio images are perceived as inside the head. This is because there are none of the cues that acoustics impart to the sound of loudspeakers in a room. Binauralizing simulates the complex acoustics of a listening room where sounds reflect off various surfaces, effectively convincing listeners that the sound is originating from multiple speakers around them. Moreover, such processing can simulate a variety of rooms with different acoustics. Commercial examples include DOLBY HEADPHONE™ and DOLBY SPEAKER™.

Another example included in what we call spatializing is upmixing: adding additional channels to audio data, such as creating surround sound, e.g., 4, 5, or 7 channel audio data from stereo (2 channel) audio data.

For the sake of brevity, details of binauralizing are not provided herein. The main point is that such signal processing can be computationally complex, so might not be carried out on a resource constrained device. Carrying out such processing upstream can advantageously make use of one or more featured of the present invention.

For more details on binauralization and spatialization, see, for example, International Patent Application No. PCT/AU98/00769 published as WO 9914983 and titled UTILIZATION OF FILTERING EFFECTS IN STEREO HEADPHONE DEVICES and International Patent Application No. PCT/AU99/00002 published as WO9949574 and titled AUDIO SIGNAL PROCESSING METHOD AND APPARATUS. Each of these applications designates the United States. The contents of each of publications WO9914983 and WO9949574 are incorporated herein by reference.

The type of parameters that are collected at the resource constrained device for such processing include whether or not to use spatialization and binuauralization, the location of the resource constrained device relative to an assumed location of one or more loudspeakers in the room, parameters indicative of the type of listening environment, e.g., type of room, and the number and location of speakers in the room desired by the user.

Other examples of quality enhancement audio signal processing also might be used. For interactive two-way conversations, such as a telephone conversation, quality enhancement signal processing methods for clarity enhancement are known, as are methods for equalization for echoes and other interferences that occur in two-way communication. Such quality enhancement signal processing methods, when used in embodiments of the present invention include carrying out such signal processing methods upstream, using accepted information from a resource constrained device related to the processing.

Video Quality Enhancement Processing for High Dynamic Range (HDR) Displays

Conventional CRT and LCD video monitors have a dynamic range of 600:1, while good LCD video monitors have a dynamic range of 1000:1. The human eye has a dynamic range far higher that any such display can produce. The luminance of starlight is around 0.001 cd/m2 and the luminance of a sunlit scene is around 100,000 cd/m2-hundred millions times higher. The luminance of the sun is approximately 1,000,000,000 cd/m2. A scene showing the interior of a room with a sunlit view outside the window has a dynamic range around 100,000:1. So such a scene will not appear realistic when shown on a conventional display CRT or LCD display. High dynamic range (HDR) displays have recently been developed that can dramatically increase the contrast of displays. Such HDR displays are able to show greatly increased brightness, with true blacks and bright whites, and also show details in dark and light regions.

HDR displays and the technology behind them are marketed by as DOLBY CONTRAST, DOLBY HDR, and DOLBY VISION by Dolby Laboratories, Inc., related to the assignee of the present invention. HDR displays now being constructed use for a backlight modulated light sources such as modulated LEDs. Such backlights are sometimes called IMLED (Individually Modulated Array of LED) backlights. In one version, the brightness of each LED is controlled by an 8-bit signal, so each LED has 256 brightness steps. Rather than having a single light source behind an LCD screen, a plurality of small regions are backlit in a modulated manner according to the local brightness and contrast in the scene being shown.

The modulating signals are obtained by carrying out processing on the video signal to generate signals more modulating the LEDs for the backlighting. For more detail, see for example, Helge Seetzen, Wolfgang Heidrich, Wolfgang Stuerzlinger, Greg Ward, Lorne Whitehead, Matthew Trentacoste, Abhijeet Ghosh, Andrejs Vorozcovs: "High dynamic range display systems," ACM Transactions on Graphics (TOG), Volume 23, Issue 3, Special Issue: Proceedings of the 2004 SIGGRAPH Conference (August 2004). See also U.S. Pat. No. 6,891,672.

The signal processing to determine the modulation signal from a video signal is not trivial. Therefore, a resource constrained viewing device may not be capable of such processing. However, such signal processing can advantageously be carried out in the upstream, according to one or more parameters that are provided, determined or measured at the resource constrained viewing device or in the environment of such a device.

Thus, it is known to modify contrast and brightness according to the local viewing conditions, e.g., the brightness of the viewing environment. In one embodiment, an environmental sensor determines a measure of brightness in the viewing environment. The environment brightness is sent to the upstream process. In one embodiment, one or more other parameters are sent, e.g., a parameter to indicate the amount of contrast enhancement, a parameter to indicate the brightness setting desired by the viewer and so forth. The upstream processor received such parameters from the resource limited viewing device, and carries out signal processing to determine the levels for the backlighting of the LED devices. Typically, the backlighting is monochromatic, and is a much courser resolution than the main video. The lower resolution backlighting data is sent together with the video signal to the resource limited device, adjusted according to the received parameters, and is rendered in combination by the resource limited viewing device.

A Method and Other Embodiments

Figure 1B:
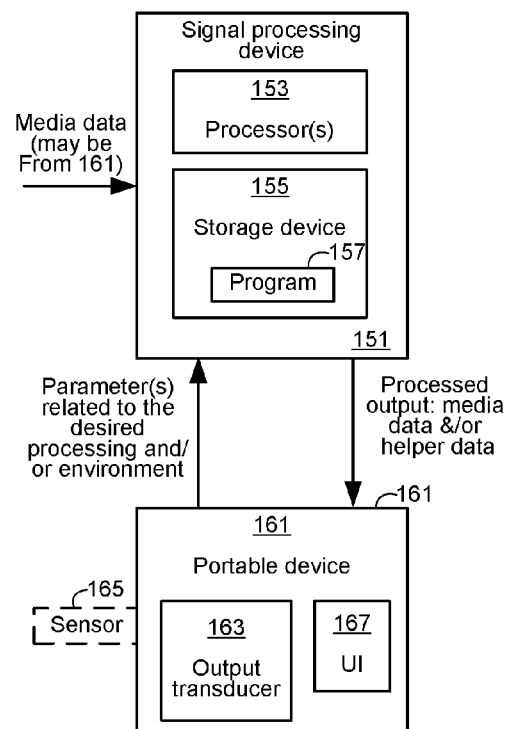
FIG. 1B shows a functional block diagram describing some apparatus embodiments of the invention, and also a program logic embodiment of the invention.

FIG. 1A shows a simplified flowchart of one method embodiment of the invention and FIG. 1B shows a functional block diagram of an apparatus embodiment 150 of the invention. The apparatus 150 includes a processing system 151 and a resource constrained device 161, such as a wireless portable device. The processing system 151 includes at least one processor 153 and a storage system 155. One embodiment is in the form of program logic 157 in the storage medium 155 that when executed causes method steps shown in the flowchart to be carried out.

The method 100 operates the processing system 151 and includes the following method steps: in 103, accepting information from the resource constrained device 161 related to processing media data that is for rendering by the resource constrained device, and in 105 processing the media data using at least some of the accepted information to generate processed output. The processing 105 of the media data is when or where resources, e.g., electric power and/or processing power sufficient for the processing are available. The processed output is usable by the resource constrained device 161 to render the media data, or to both carry out some processing of the media data and to render media data. The information related to processing includes information obtained at the resource constrained device 161, and includes metadata, i.e., a set of one or more parameters related to the desired processing of the media data, and/or one or more environmental quantities, i.e., one or more parameters related to the environment of the resource constrained device.

The resource constrained device, e.g., the portable device 161 includes at least one output transducer, e.g., earphones and/or loudspeaker(s) and/or a display screen and any other resources needed to render the media data sent to it. In those embodiments in which environmental quantities are obtained at the resource constrained device 161, the device 161 includes one or more sensors 165. The portable device typically further includes at least one processor. A user interface 167 is provided for the user to enter information, e.g., there is a volume control input mechanism in the case of listening. The need for such additional elements would be clear to those in the art, so may always be explicitly stated in the description herein, so as not to distract form the inventive aspects. Also not shown in the drawings herein are such elements as a wireless interface, batteries, a client device processor, one or more amplifiers, and so forth that might be present in a portable device 161, as would be clear to those in the art.

In the flowchart of FIG. 1A, the method further includes in 107 sending the processed output to the mobile device for use by the mobile device 161, or storing the processed data for use by the mobile device 161.

The method further includes in 109 rendering the data at the mobile device 161.

In some embodiments of the method in which some media data processing occurs at the resource constrained device 161, the processed output includes helper data for use by the resource constrained device for the media data media data processing at the at the resource constrained device. In the case helper data is generated and sent to the mobile device 161, 109 includes processing media data using the helper data as well as rendering the processed media data.

In some embodiments of the method, the signal processing system 151 is incorporated in the portable device 161, but not all resources/elements are usable at all times. That is, some of the processing occurs when sufficient resources are available.

In some embodiments of the method, the processing uses at least one of the metadata and/or environmental quantities to generate processed output that includes processed media for rendering by the resource constrained device. In some implementations, the processing of the media data is prior to rendering of the processed media data on the resource constrained device.

1. Examples of Upstream Real-Time Quality Enhancement Signal Processing Using Metadata and Environmental Signals Generated by a Portable Wireless Device Described herein are methods, apparatuses, and computer programs (and media embodying such programs) for carrying out resource intensive quality enhancement signal processing upstream and offloaded from a client device, e.g., a portable device that is resource constrained. The example embodiments described in this Section 1 include generating metadata and/or environmental quantities to allow powerful upstream quality enhancement signal processing of media data, e.g., speech, audio and/or video that is rendered on a portable wireless device. This Section 1 describes several use-case scenarios: a) when media is streamed onto a wireless portable device, e.g., in an Internet broadcast-type scenario, b) when media is interactively streamed across a network, e.g., when two-way communication is taking place, for example a telephone conversation, and c) when media originates or is stored on a wireless portable device and is rendered on the same device, e.g., real-time recording and forwarding or playing back media data stored on the device. In all cases, the media is processed prior to playback on a remote resource constrained device, with the processing controlled as a result of the environmental quantities in the playback environment, user input and/or portable device settings.

1.1 Upstream Processing of Media Data Streamed to the Device Using Metadata

Figure 2:
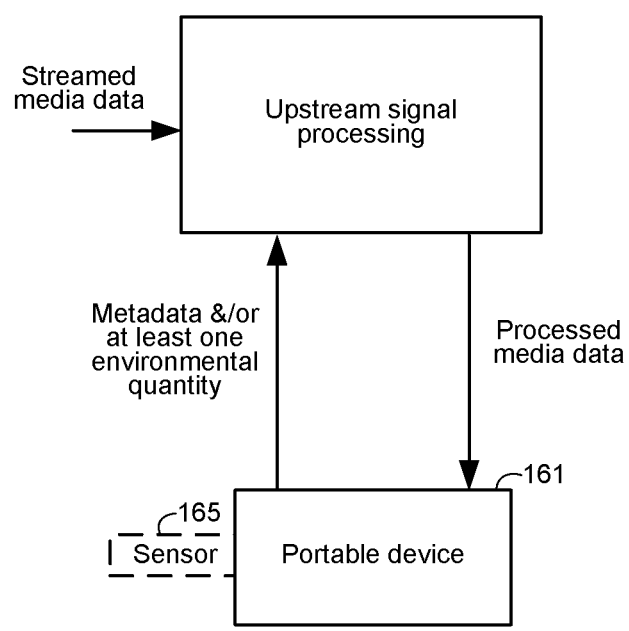
FIG. 2 shows a simplified block diagram of an apparatus that includes upstream processing of multi-media data using metadata generated by a client device, e.g., a portable wireless device according to one or more features of the present invention.

FIG. 2 shows a simplified block diagram of an apparatus that includes upstream processing of multi-media data using metadata and/or environmental quantities generated by a client device 161, e.g., a portable wireless device 161 according to one or more features of the present invention. Quality enhancement signal processing desired by the user of a client device, e.g., a portable device is performed by an upstream signal processing device that is controlled by metadata requests generated by the portable device. Typical desired quality enhancement signal processing for speech and audio media data include, as described above, and in more detail herein below, enhanced volume control, loudness leveling, equalization processing, dialog clarity enhancement, binaural spatialization, and so forth. When one or more environmental quantities are sent from the device 161, e.g., via one or more sensors 165, typical desired quality enhancement signal processing for speech and audio media data includes noise compensation with leveling. Typical desired quality enhancement signal processing for video include noise filtering, contrast enhancement, color compensation, etc.

Figure 3:
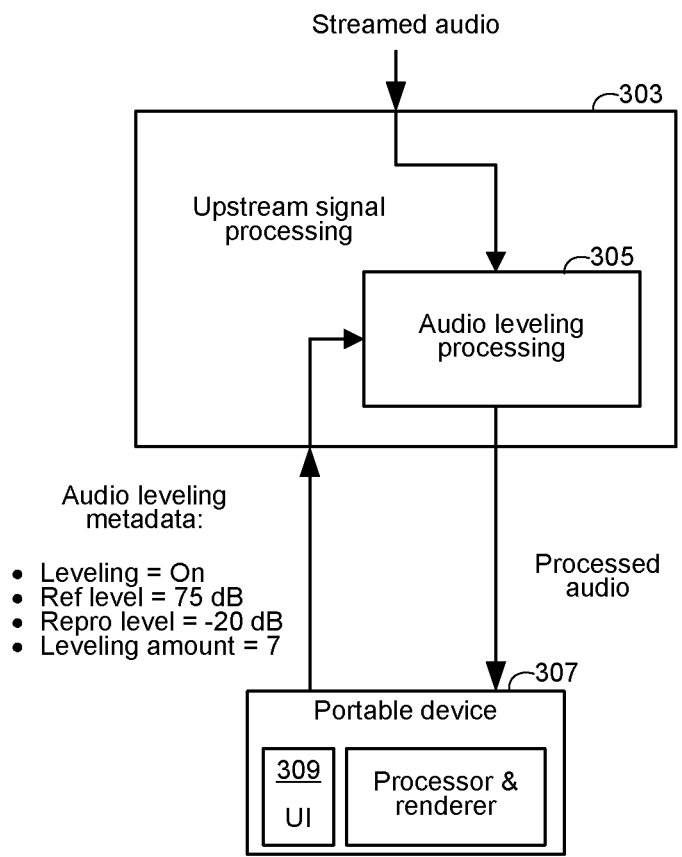
FIG. 3 shows a simplified block diagram of an apparatus that includes an example of audio leveling upstream processing of audio media data using metadata generated by a client device, e.g., a portable wireless device.

FIG. 3 shows a simplified block diagram of an apparatus embodiment in which the signal processing in a signal processing block 303 includes loudness compensated leveling of audio media data using metadata generated by a client device, e.g., a portable wireless device 307. Such loudness compensated leveling is briefly described above, and is further described in more detail below.

In some embodiments, the signal processing block 303 includes a processor and a storage device that includes program logic configured with instructions to carry out method steps according to some embodiments of the present invention.

Note that a different reference numeral is used for this device because of differences compared to the devices in other embodiments, but essentially, device 307 has functionally similar elements to those in device 161 in the more general drawings.

For leveling, the metadata parameters, called "leveling parameters" for the case of leveling, provide sufficient information to an upstream signal processing system to process audio being streamed to the client device, e.g., the portable device 307. These parameters in one embodiment include in indication of whether or not audio leveling is to be used, some device information, such as a reference reproduction level for the device, and some algorithm parameters, such as the desired reproduction level and leveling amount. This metadata is transmitted to the upstream signal processing system 303 that has the capacity and capability to perform audio leveling, e.g., a system 303 that includes an audio leveling block 305. In the upstream signal processing device 303, the portable device metadata is received, as is the streamed audio data, and these are input to the audio leveling process block 305, which processes the incoming audio and after leveling processing continues to stream the audio to the portable device 307 for rendering, i.e., for playback. The audio leveling block 305 may be one of many such functions that are part of a general purpose audio signal processing block in the upstream signal processing device. More details of audio leveling are provided herein below.

In one example embodiment, the following leveling metadata parameters are used. The quantities in parentheses are example values and units used in the embodiment:

Parameter 1: Leveling On/Off (e.g., 0 for On or 1 for Off)
Parameter 2: Portable device reference reproduction level (75 dB)
Parameter 3: Target reproduction level (−20 dB)
Parameter 4: Leveling Amount (1-10)

Some of these parameters are pre-defined for the particular device 307, while others are entered via a user interface 307 provided at the device 307. In one embodiment, a signaling protocol is defined for sending the metadata to the signal processing system.

It would be clear that a configuration similar to that of FIG. 2 can be used for other types of quality enhancement media data signal processing.

1.2 Upstream Processing of Media Data Streamed to the Device Using Metadata and One or More Environmental Quantities Another set of embodiments include using one or more environmental quantities in the quality enhancing signal processing. Multimedia data is streamed or broadcast to the client device, e.g., a portable device. However, in this case it is desired that the upstream signal processing take into account information about the environment in which the portable device is operating. Depending on the type of media data, useful environmental information may include such things as an estimate of the reproduction environments acoustic noise profile in the case of audio data, or the ambient light in which the device is operating in the case of video data.

Figure 4:
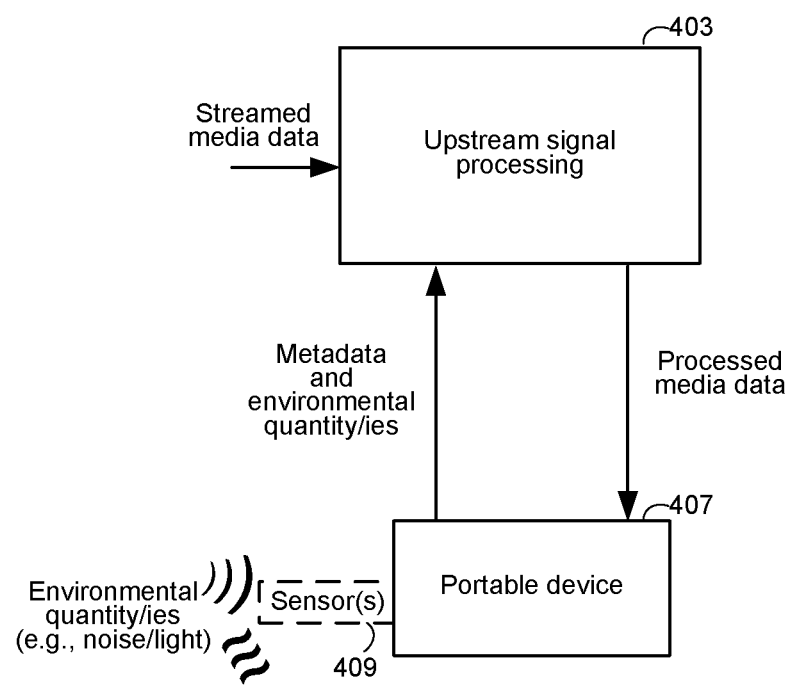
FIG. 4 shows a simplified block diagram of an apparatus that includes upstream processing of multi-media data using metadata and environmental information generated by a client device, e.g., a portable wireless device.

FIG. 4 shows a simplified block diagram of an apparatus embodiment in which the quality enhancing signal processing carried out in a signal processing block 403 includes processing that uses one or more environmental quantities sent from a client device, e.g., a portable wireless device 407 that are indicative of the environment the device 407 is operating in. In some embodiments, metadata generated by a client device 407 also is received by the processing block 403. The one or more environmental quantities are determined at the portable device 407 from measurements obtained from one or more sensors 409, e.g., one or microphones in the case of measuring background noise or other audio, and/or one or more light sensors in the case of measuring ambient lighting. The upstream quality enhancing signal processing signal processing carried out in block 403 uses the environmental quantities and other metadata in the case metadata is included, and generated processed media data for rendering at the portable device 407.

In some embodiments, the signal processing block 403 includes a processor and a storage device that includes program logic configured with instructions to carry out method steps according to some embodiments of the present invention.

Quality enhancement signal processing techniques for audio data that can make use of an estimate of the acoustic noise profile in the mobile device's environment include noise compensation, AGC, dynamic range compression, equalization, and so forth. Quality enhancement signal processing techniques for video data can make use of an estimate of the environmental lighting include saturation adjustment, brightness adjustment, contrast adjustment, and so forth, including, for example, generating image dependent signals for modulating a set of backlighting elements for a flat panel display device that uses multiple individually modulated light elements, such as LEDs for backlighting.

In one embodiment, 20 noise spectral magnitude values are used. In another, 40 noise spectral magnitude values are used. Those with experience in leveling and noise compensation have found that between carrying out leveling and noise compensation in 20 and 40 frequency bands provides good results based on today's processing capabilities. Of course, as technology progresses, more spectral bands might be used, and in some situations where even the upstream processing is somewhat constrained, fewer frequency bands, and hence spectral noise values might be used. Typically, the environmental quantities are sent at a much lower rate than the frequency ranges of the audio data, e.g., at around one set of quantities per second.

Figure 5:
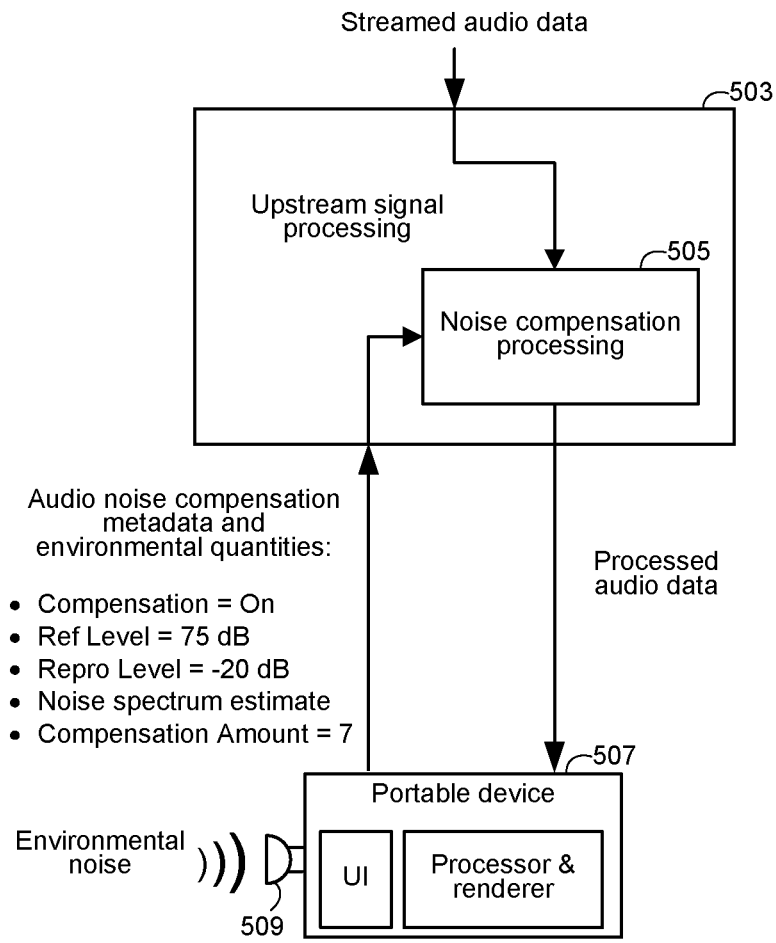
FIG. 5 shows a simplified block diagram of an apparatus that includes an example of noise compensation upstream processing of audio media data using metadata and environmental noise information generated by a client device, e.g., a portable wireless device.

FIG. 5 shows a simplified block diagram of an apparatus embodiment in which the signal processing in a signal processing block 503 includes noise compensation of audio media data using metadata and environmental noise quantities generated by a client device, e.g., a portable wireless device 507. Such noise compensation leveling is briefly described above, and is further described in more detail below. FIG. 5 shows some typical values of metadata and environmental quantities that might be sent. These parameters in one embodiment include in indication of whether or not noise leveling is to be used, some device information, such as a reference reproduction level for the device, and some algorithm parameters, such as the desired reproduction level and leveling amount. The environmental quantities include an estimate of the noise power, e.g., noise magnitude in a set of some number of bands provides the environmental quantities. These are determined by a processor included in the device 507 that accepts input from an included microphone 509. In one embodiment, 20 noise spectral magnitude values are determined and used. In another, 40 noise spectral magnitude values are used. Those with experience in leveling and noise compensation have found that between carrying out leveling and noise compensation in 20 and 40 frequency bands provides good results based on today's processing capabilities. Of course, as technology progresses, more spectral bands might be used, and in some situations where even the upstream processing is somewhat constrained, fewer frequency bands, and hence spectral noise values might be used. This metadata and environmental quantities is transmitted to the upstream signal processing system 503 that has the capacity and capability to perform audio noise compensation, e.g., a system 503 that includes a noise compensation processing block 505.

Typically, the environmental quantities are sent at a much lower rate than the frequency ranges of the audio data, e.g., at around one set of quantities per second.

In some embodiments, the signal processing block 503 includes a processor and a storage device that includes program logic configured with instructions to carry out method steps according to some embodiments of the present invention.

In the upstream signal processing device 503, the portable device metadata and environmental quantities are received, as is the streamed audio data, and these are input to the noise compensation processing block 505, which processes the incoming audio and after such processing continues to stream the processed audio data to the portable device 507 for rendering, i.e., for playback. The noise compensation processing block 505 may be one of many such functions that are part of a general purpose audio signal processing block in the upstream signal processing device. More details of noise compensation processing are provided herein below.

In one embodiment, for loudness-based noise compensation, the following metadata parameters and environmental information provide the information sufficient for upstream signal processing that includes noise compensation processing to process audio data being streamed to a client device, e.g., a portable device. Units used in one embodiment, and some typical values are shown:

Parameter 1: Noise compensation On/Off (0 or 1)
Parameter 2: Portable device reference reproduction level (75 dB)
Parameter 3: Target reproduction level (−20 dB)
Parameter 4: Noise spectrum estimate, e.g., 20 to 40 noise spectral magnitude values sent approximately once a second.
Parameter 5: Noise compensation amount (1-10)

Figure 6:
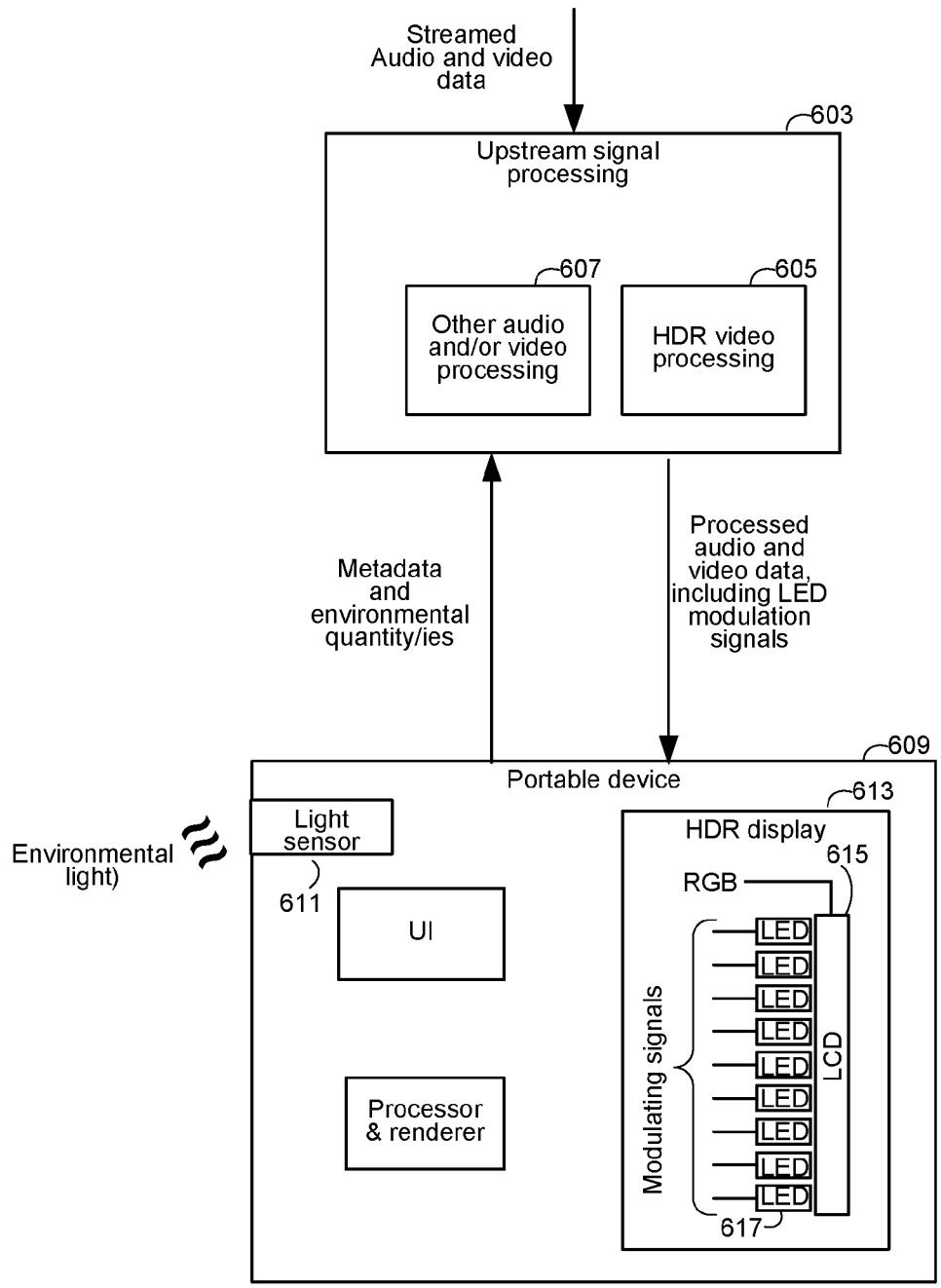
FIG. 6 shows a simplified block diagram an embodiment of the invention in wherein video data is streamed via a signal processing apparatus to a portable device that includes a high dynamic range (HDR) video display.

FIG. 6 shows a simplified block diagram of another embodiment of the invention in which media data is streamed via a signal processing apparatus 603 to a portable device, in this case, a wireless device 609 that includes a high dynamic range (HDR) video display 613 made up of an LCD panel 615 and a number of individually modulated light emitting diode (LED) devices 617 that provide spatially dependent modulated backlighting. FIG. 6, of course, shows the display 613 is a most simplified two-dimensional form. The portable device 609 includes a light sensor 611 configured to measure an indication of ambient light. The ambient light environmental quantity, at some rate, e.g., once per second, together with one or more other items of metadata related to quality enhancement processing of the audio and/or video, are sent to the upstream signal processing apparatus 603. The upstream signal processing apparatus includes an HDR signal processor configured to accept the ambient light environmental quantity and the video data, and further configured to process the video data to generate modulation signals usable by the portable device to generate the signals for the individually modulated LED devices 617 in the HDR display 613. The processing is to enhance the contrast in the video according not only to the luminance in the video signal, but additionally according to the ambient lighting in which the video is being viewed at the portable device 609. The processing apparatus 603 additionally may include other audio and/or video quality enhancement processing according to other items of metadata and possible other environmental quantities, e.g., background noise.

In some embodiments, the signal processing block 603 includes a processor and a storage device that includes program logic configured with instructions to carry out method steps according to some embodiments of the present invention.

It will be clear to those in the art that these are but a few examples of possible audio data quality enhancement signal processing and/or video data quality enhancement signal processing that can be carried out by different embodiments that have the general structure of FIG. 4.

Figure 7:
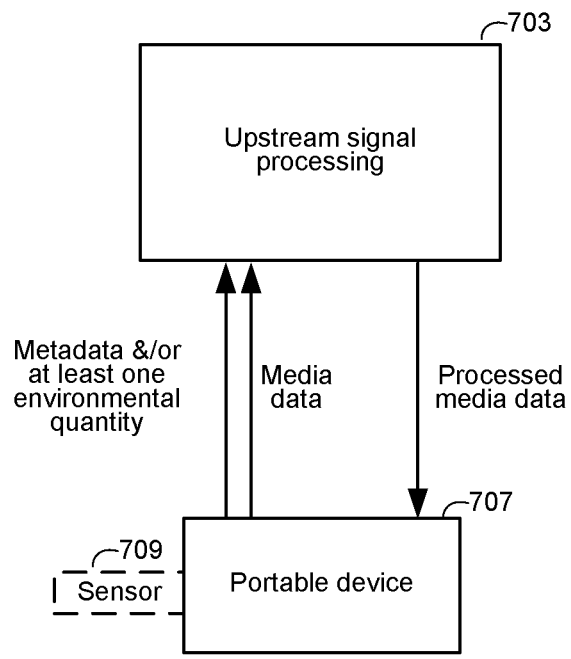
FIG. 7 shows a simplified block diagram of an arrangement that includes upstream quality enhancement processing of media data from a client device, e.g., a portable wireless device using metadata generated by the device and/or one or more environmental quantities from the device.

1.3 Upstream Processing of Media Data Using Metadata: the Media Data Streamed from a Device FIG. 7 shows a simplified block diagram of another arrangement for upstream quality enhancement signal processing of media data using metadata and possibly environmental information generated by a client device, e.g., a portable wireless device 707. In this arrangement, the media data, e.g., audio and/or video media data is streamed from the portable device upstream to an upstream signal processing apparatus 703. The media data that is streamed upstream is from a storage device in the client device 703, e.g., includes video, or music in the device, or music that originates in real time at the device. In the case that the device 707 sends one or more environmental quantities, the device 707 includes one or more sensors 709 for measuring environmental information.

It should be noted that for some wireless situations, the resource requirements for streaming media data to an upstream signal processing device are less than those required to do intensive signal processing on the portable device. These include situations when the portable device is connected to a network incorporating micro-cells or pico-cells which allow low power wireless communications between a client device, e.g., a portable device and an upstream signal processing system.

Figure 8:
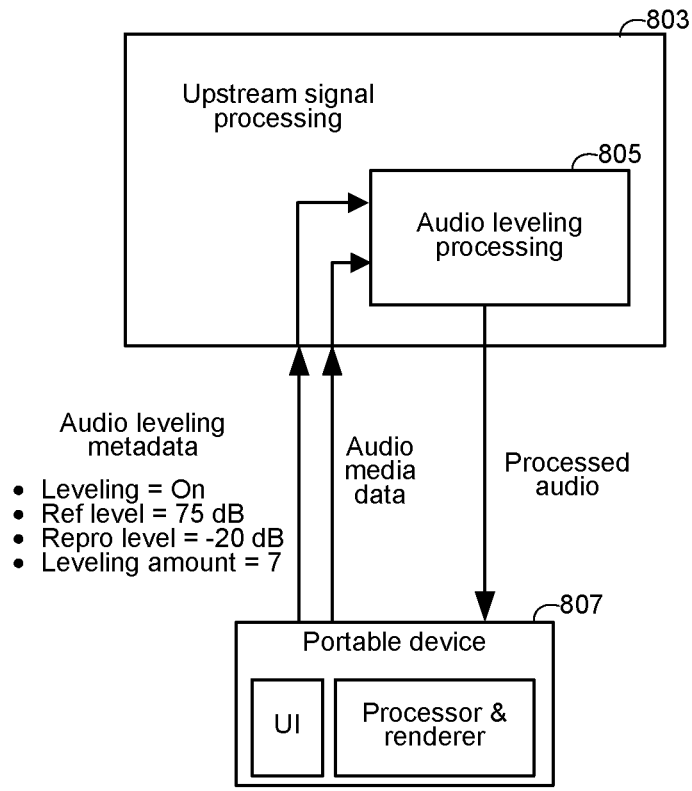
FIG. 8 shows a simplified block diagram of an apparatus that includes an example of audio leveling upstream processing of audio media data from a client device, e.g., a portable wireless device using metadata generated by the device.

Sections 1.1 and 1.2 above describe some examples of quality enhancement audio signal processing for the arrangements of FIGS. 2 and 4 of the audio data streamed to the resource constrained device. From those descriptions and drawings, those skilled in the art will understand that many if not all such cases are applicable to the arrangement of FIG. 7. For example, FIG. 8 shows an example embodiment of audio leveling using metadata sent from a portable device 807 to an upstream signal processing apparatus 803 that includes an audio leveling processor 805. Audio data also is sent in the upstream from the portable device 807 to the signal processing apparatus 803. The metadata is the same as shown in FIG. 3. The portable device metadata and the streamed audio data are accepted by the audio leveling process block 305, which processes the incoming audio data and after processing streams the processed audio back to the portable device 807 for playback.

In some embodiments, the signal processing block 803 includes a processor and a storage device that includes program logic configured with instructions to carry out method steps according to some embodiments of the present invention.

Figure 9:
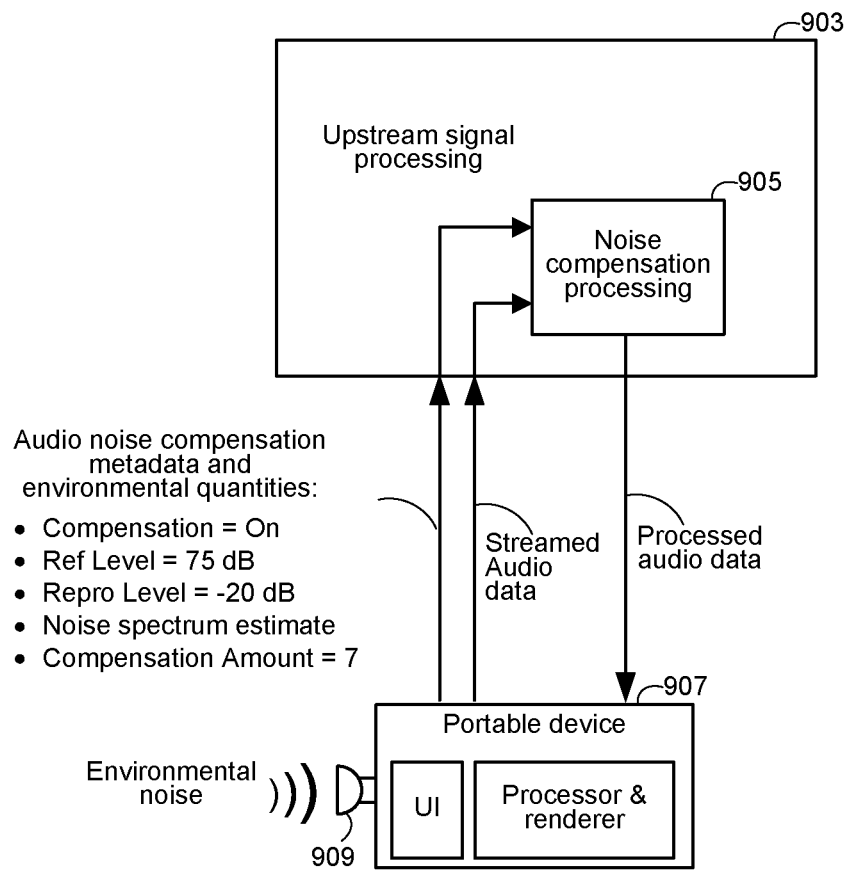
FIG. 9 shows a simplified block diagram of an apparatus that includes an example of noise compensation upstream processing of audio media data originating from a client device, e.g., a portable wireless device using metadata and environmental noise information generated by the device.

FIG. 9 shows another example that is similar in structure to that of FIG. 5, but with audio data streamed from a portable (and resource limited) device 907 that includes a noise sensor 909 to an upstream signal processing apparatus 903 that includes a noise compensation processing block 905. Metadata and noise spectrum estimate environmental quantities are sent from the device 907 to the processing apparatus 903. The noise compensation processing block 905 processes the upstreamed audio data according to the received metadata and environmental quantities, and the processed audio data is sent back to the portable device for playback.

In some embodiments, the signal processing block 903 includes a processor and a storage device that includes program logic configured with instructions to carry out method steps according to some embodiments of the present invention.

Those in the art will understand that the arrangement of FIG. 7 with media data streamed to the upstream quality enhancement signal processing apparatus is applicable to many types of quality enhancement signal processing. Examples includes, in the case of audio data streamed from the device, volume control processing, loudness leveling processing, dynamic range compression, automatic gain control, dynamic equalization processing, spatialization, and so forth, and when there are environmental quantities sensed at and sent to the upstream signal processing apparatus, noise compensation that might also include dynamic range compression, automatic gain control, dynamic equalization processing, spatialization, and so forth. Typical signal processing requests for video originating from the portable device would again include color compensation, contrast enhancement processing for HDR displays, and so forth.

2. Off-Line Signal Processing of Media Data Using Metadata and/or Environmental Quantities from a Client Device Portable media players such as the iPod (Apple Computer, Inc) are used in a variety of usage and environmental scenarios. As with a wireless device to which media is streamed, there are a variety of specialized quality enhancement signal processing functions that can be applied to media data to improve playback for particular scenarios. One example is dynamic frequency equalization with AGC or dynamic range compression applied to audio for playback in a noisy environment such as an automobile. Another example could be down-mixing a stereo program for mono for use when only a single earphone is used. Such processing is widely used and has been applied in real time—e.g. the "mono" button on a home audio receiver, or pre-applied, e.g., AGC or dynamic range compression of audio for in-flight entertainment on an airplane.

As previously described, a client device, e.g., a portable device may not have the resources, e.g., sufficient processing power or battery capacity to implement complex quality enhancement signal processing during playback. As a further constraint, the portable device may not have connectivity to a remote device during playback, e.g., it is a simple playback device, not a telephone or otherwise wirelessly connected device, or is a device capable of wireless connection, but is currently not so connected. In this Section 2 quality enhancement signal processing is described that is applicable to such usage scenarios. In these examples, the metadata and/or environmental quantities that are (later) accepted by the signal processing apparatus are first captured and saved at the portable media player. Such a device may have ability to measure and save the current environment or user selected use scenario, typically, though not necessarily in response to a user request to "capture this scenario." In the following descriptions this shall be referred to as "captured metadata and/or environmental quantities." At a later time, e.g., "off-line", media data is analyzed and/or processed based on the captured metadata and/or environmental quantities. Later still, when the user plays back the media in the portable device in an environment similar to one previously captured, the media data can be rendered with enhanced quality using the analysis or signal processing that carried out done off-line.

There are several means by which the captured metadata and/or environmental quantities can be used to enhance the final rendering of the media.

Example case 1: A user connects a portable device to a signal processing device such as a personal computer or other media source, the captured metadata and/or environmental quantities is/are transferred to the signal processing device. The signal processing device analyzes the captured metadata and/or environmental quantities, processes media for quality enhanced playback, and transfers the pre-processed media to the player.

Example case 2: A user connects a portable device to a signal processing device such as a personal computer or other media source, the captured metadata and/or environmental quantities is/are transferred to the signal processing device. The signal processing device analyzes the captured metadata and/or environmental quantities and generates helper data, e.g., a set of parameters that enables efficient processing of the media data on the portable device, e.g., in real time when media data is streamed to the portable device.

Example case 3: The scenario is similar to example case 2, but the analysis, media processing and/or generation of helper data takes place on the portable device when there are sufficient resources, e.g., when the device is "docked" so that external power is available, or when there is more time, or lower processor load.

Each of these scenarios is described in more detail in the following sections.

2.1 Off-Line Quality Enhancement Signal Processing of Media Data on a Signal Processing Apparatus.

Figure 10:
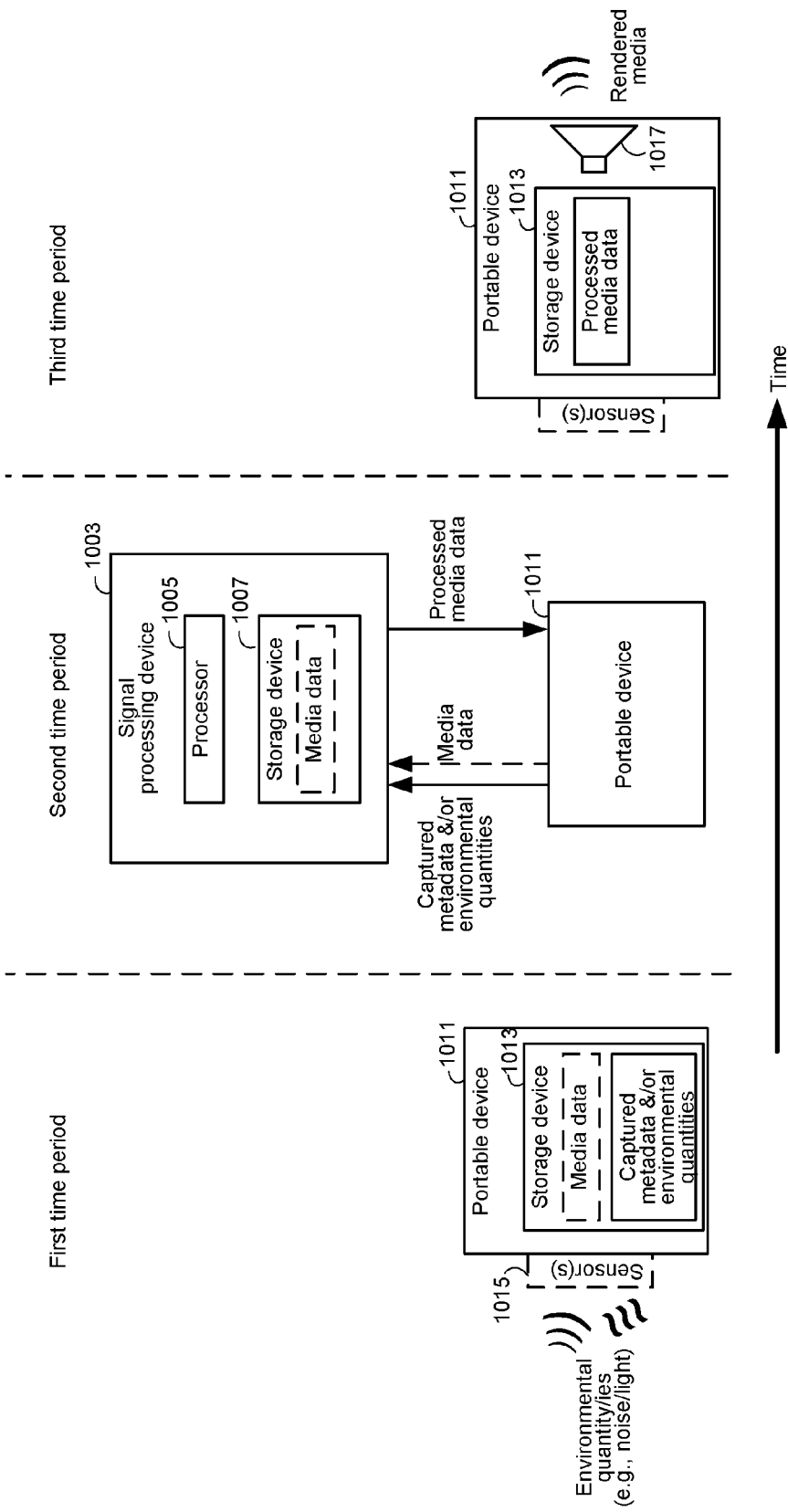
FIG. 10 shows a simplified block diagram of an apparatus that includes off-line signal processing of media data on a secondary device.

FIG. 10 shows an arrangement according to some embodiments of the invention that include off-line quality enhancement signal processing of media data on a signal processing apparatus 1003 for playback of the processed media data on a portable device 1011. The signal processing apparatus includes at least one processor 1005 and a storage device 1007 that include program logic configured with instructions to carry out method steps according to some embodiments of the present invention. The portable device 1011 includes a storage device 1013, e.g., memory and/or disk storage, and a rendering device 1017, e.g., one or more loudspeakers in the case of audio and a display screen in the case of video. In some embodiments, the portable device 1011 may also include one or more sensors 1015 configured to measure environmental information on the environment of the portable device that is indicative of how media data is to be played back. In a first time period, one or more items of metadata related to desired quality enhancement signal processing is captured and stores in the storage device 1013 of the portable device 1011. In some embodiments, the media data for processing is stored in the storage device 1013 of the portable device 1011, while in other embodiments, the media data for processing instead or in addition stored in the storage device 1007 of the signal processing apparatus 1003. Hence the media data is shown in broken line form in FIG. 10. The signal processing apparatus 1003 is a personal computer or other media processor.

In a second time period after the first, the portable device is connected either by a dock or wirelessly, e.g., via a network to the signal processing apparatus 1003. The portable device sends the captured metadata and/or environmental quantities to the signal processing device. In the case that the to-be-processed media data is only in the portable device, the media data also is sent to the signal processing device 1003, as shown by the dotted line. The signal processor apparatus 1003 is configured to accept the captured metadata and/or environmental quantities, and media data for those embodiments that include media data not initially in the processing apparatus 1003. The signal processing apparatus 1003 using the at least one processor 1005 analyzes the captured metadata and/or environmental quantities, processes the media for quality enhanced playback, and transfers the processed media to the portable device 1011.

The processed media data is then rendered/played back by the portable device 1011. In the example embodiments of FIG. 10, the rendering at the portable device 1011 is at a third time period later than the second period. Of course, the playback can occur also or instead during the second time period during which the portable device is connected by a dock or wirelessly to the signal processing device.

As an example, consider the case of a user who routinely uses their portable device on a train while commuting. One may wish to modify the audio to improve the subjective impression when listening in this noisy environment. One can then advantageously apply noise compensation. Such noise compensation is described above and in more detail below. The train noise is measured and the necessary parameters are derived. For effective loudness-based noise compensation, as also described above, the following metadata parameters and environmental information is useful for customization of the audio: whether noise compensation is to be carried out or not, e.g., as a binary item of metadata (0 or 1), the reference reproduction level, e.g., in dB, say 75 dB for the portable device 1011, the target reproduction level, e.g., in dB, say −20 dB, and noise spectrum estimate quantities, e.g., a number, say 20 or 40 noise spectral magnitude values sent approximately once a second. Later, when the user returns home, the portable device is connected or becomes wirelessly connected to a personal computer or other device. The captured metadata and environmental quantities are transferred to the personal computer, the original audio is processed based on these parameters, and the processed audio is transferred to the portable device. The next time the user is on the train, the user can play back the processed audio with custom noise compensation for noise typical for the train.

It would be clear to those in the art that other types of quality enhancement processing can be applied to arrangements such as shown in FIG. 10.

2.2 Off-Line Signal Processing to Generate Helper Data for Quality Enhancement Signal Processing on the Portable Device.

Figure 11:
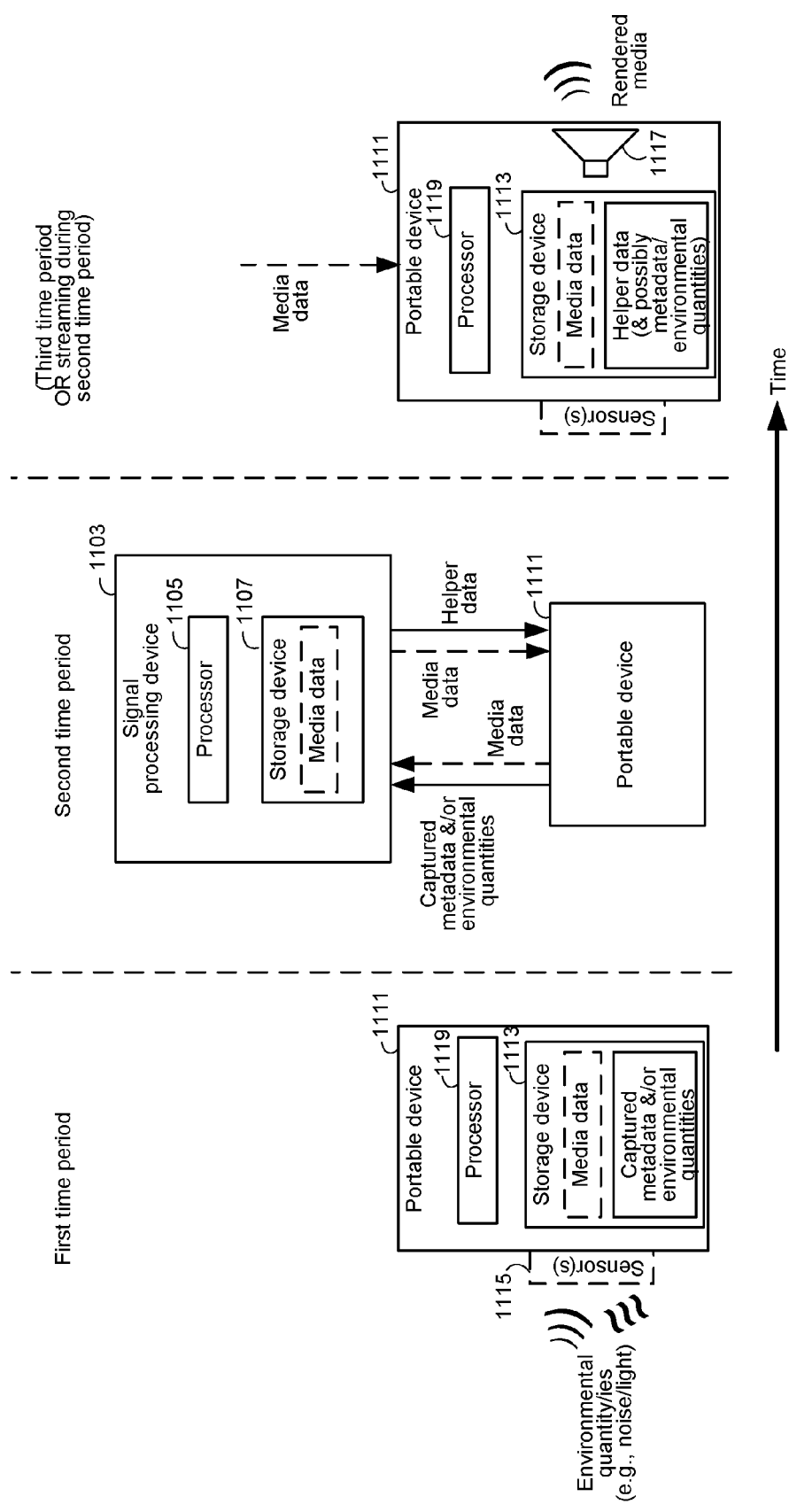
FIG. 11 shows a simplified functional block diagram that illustrates several embodiments of the invention in which some of the processing for the overall quality enhancement occurs at a resource limited device, but wherein more computationally intense functions of the overall quality enhancement signal processing occurs off-line on a separate signal processing apparatus.

FIG. 11 shows a simplified functional block diagram that illustrates several embodiments of the invention in which some of the processing for the overall quality enhancement occurs at a resource limited device, e.g. a portable device 1111, but wherein more computationally intense functions of the overall quality enhancement signal processing occurs off-line on a separate signal processing apparatus 1103. The signal processing apparatus 1103 includes at least one processor 1105, and a storage device 1107, e.g., including a memory and other storage mechanisms that include program logic configured with instructions to carry out method steps according to some embodiments of the present invention. The portable device 1111 includes at least one processor 1119 and a storage device 1113 that includes memory and may include other storage element(s). For those embodiments in which environmental quantities are sent to the signal processing apparatus 1103, the portable device 1111 includes at least one environmental sensor 1115. As in the cases described in Section 2.1 above, at a first time period, metadata and/or one or more environmental quantities are captured at the resource limited device 1111 and, e.g., stored in the storage device 1113 of the device 1111.

At a second time period, when the device 1111 is connected, e.g., via a dock, or wirelessly to the signal processing apparatus 1103, the captured metadata and/or environmental quantities is/are transferred to the signal processing device 1103. In some embodiments, the to-be-processed media data is stored on the portable device 1111, in others at the signal processing device 1103, and yet in others, in both the portable device 1111 and the signal processing apparatus 1103. For this reason, the media data block is shown in broken lines in each device 1111 and 1103, so as to indicate it may be in one and not the other device. The signal processing device uses the captured metadata and/or environmental quantities to process the media data to helper data in the form of parameters that are usable to complete quality enhancement signal processing, e.g., that provide processing parameters to be used by the portable device during playback of the media data on the client device. The helper data is transferred to the media player. The helper data provides processing parameters to be used by the portable device during playback of the media data on the client device. The processing parameters are derived based on the captured metadata and/or environmental quantities, and provide customized signal processing for playback in the previously captured playback scenario.

At a later time, or even during the time that the portable device 1111 is connected to the signal processing apparatus 1103, the media data is processed using the helper data, and the processed media data is played back.

The unprocessed media can be stored on the signal processing device 1103, and transferred to the client device 1111, or it could be stored on the client device 1111.

In some embodiments, the storage device of processing device 1103 includes program logic configured with instructions to carry out method steps according to some embodiments of the present invention.

As an example of audio quality enhancement signal processing, consider again the case of a user who routinely uses their portable device on a train while commuting. One may wish to modify the audio to improve the subjective impression when listening in this noisy environment. Loudness-based noise compensation can achieve this. As is described in more detail below, loudness compensation includes determining the specific loudness of the original audio and a loudness domain quantity—the excitation—of the noise based on the environmental noise quantities. From these, a set of multiplicative gains for different frequency bands can be determined. Such processing may be too computationally complex to be carried out at the resource limited device, while applying the gains can be carried out at the device, e.g., in real time during streaming. For such an example situation, according to an embodiment of the invention, the following metadata parameters and environmental information provide sufficient information to an upstream signal processing system 1103 to process the audio to generate helper data usable for processing playback on a client device, e.g., a portable device 1111. Also shown are typical values and units:

Noise Compensation On/Off (0 or 1).
Portable device reference reproduction level (75 dB)
Target reproduction level (−20 dB)
Noise compensation Amount (1-10)
Noise spectrum estimates, e.g., 20 to 40 noise spectral magnitude values sent approximately once a second.

In some embodiments, the signal processing uses the metadata and environmental quantities to generate the following helper data for loudness-based noise compensation. Also shown are some typical units and values:

Parameter 1: Target reproduction level (−20 dB)
Time varying, multi-band gains, e.g., 20 to 40 values.

While typically, the original metadata would be stored in the device 1111 for use during playback, in the case that such data was not so stored, the helper data would include those items of the metadata that would be used for processing for playback. In particular:

Target reproduction level, e.g., −20 dB.
Noise compensation Amount, e.g., 1-10.

Thus, when the user is on the train, in the first time period, the train noise is measured and saved along with the current user settings. Later, at the second time period, when the user returns home, the portable player 1111 is connected to a signal processing device 1103, e.g., a personal computer, e.g., via a wired dock or by wireless network connection. The captured metadata and environmental quantities are transferred to the personal computer, possibly with the media data in the case the media data is not on the signal processing device 1103. The signal processor device 1103 generates helper data such as a set of multiplicative gains to apply to a set of frequency bands and transfers the helper data to the client device 1111. The next time the user is on the train, the user can process the media data for and during playback with the aid of the helper data to provide custom noise compensation.

Other types of audio quality enhancement signal processing, and video quality enhancement signal processing can likewise be carried out using this scenario. As an example of one type of video signal processing, suppose the portable playback device includes an HDR display. During the first time period, the user can obtain typical ambient light conditions for playback, e.g., when the user commutes in the mornings in the train scenario, and a different set of quantities when the user commutes in the evenings. At the second time period, environmental quantities related to the ambient light are sent to a signal processing device, and the video media data is processing using the environmental quantities to determine a relatively small set of modulating signals for different scenes in the video media data. These modulating signals are sent to the portable device for later use. When at some later time, the user plays back the video media data, the modulating signals are used to modulate backlighting spatially distributed LEDs in the HDR display for playback that has been customized for the typical ambient light conditions for the user. In a typical HDR display, there are a far smaller number of LED locations than there are picture elements in the video, so that amount of helper data, in this case modulating signals, is far less than the video data. Furthermore, the modulating signals can be coded for different scenes so that less data need be sent to the HDR display.

Of course video processing may be combined with audio processing using an arrangement as shown in FIG. 11.

Those in the art will see how other quality enhancing media signal processing methods that can be partitioned into a relatively computationally complex portion that generates helper data, and a less computationally complex portion that uses the helper data, can beneficially use such embodiments of the invention.

2.3 Off-Line Signal Analysis and/or Processing on a Client Device.

Section 1 and Sections 2.1 and 2.2 described arrangements wherein the client device is limited in signal processing capabilities and wherein part of the signal processing is offloaded to the upstream. Referring again to FIG. 1A, recall that the processing 105 of the media data is when or where resources, e.g., electric power and/or processing power sufficient for the processing are available. Embodiments of the invention can be applies to carrying out the processing when sufficient processing resources are available. Referring to FIG. 1A, arrangements are now described wherein the elements 151 and 161 are the same apparatus, but not all elements are fully usable at all times periods. That is, the signal processing takes place in the client device itself, but when the signal processing device is able to use its full processing capabilities. However, because a client device often has limited resources, e.g., limited battery power or it would not be possible to carry out the processing in real time, it may be necessary or desirable to do the processing off-line when, for example, there is more time, access to power, or when the device is otherwise idle or lightly used, e.g., when not rendering media data.

Figure 12:
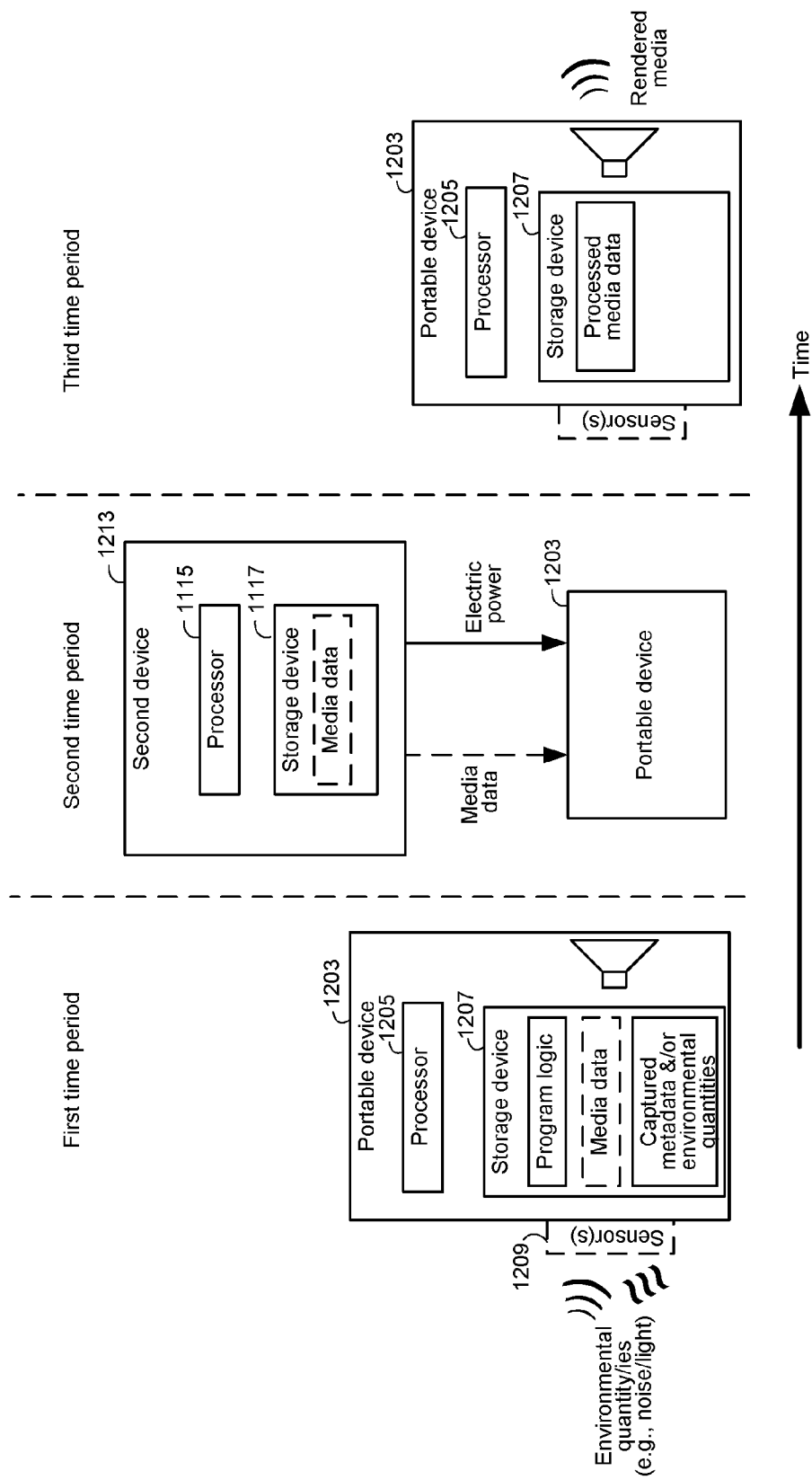
FIG. 12 shows a simplified functional block diagram that illustrates several embodiments of the invention in which the quality enhancement processing using the metadata and/or environmental quantities is when sufficient resources are available.

FIG. 12 shows a simplified functional block diagram that illustrates several embodiments of the invention in which the quality enhancement processing using the metadata and/or environmental quantities is when sufficient resources are available.

A portable device 1203 includes at least one processor 1205, and a storage device 1207, e.g., including a memory and other storage mechanisms that include program logic configured with instructions to carry out method steps according to some embodiments of the present invention, including quality enhancement signal processing of media data. For those embodiments in which environmental quantities are sent to the signal processing apparatus 1203, the portable device 1203 includes at least one environmental sensor 1209. As in the cases described in Section 2.1 above, at a first time period, metadata and/or one or more environmental quantities are captured at the device 1203 and, e.g., stored in the storage device 1207 of the device 1203. Typically, the portable device is battery operated. In some versions, the battery power is not sufficient to enable carrying out the quality enhancement signal processing without too rapidly draining the battery, or the device 1203 is typically only capable of a limited number of tasks at a time, so at the first time period, does not have sufficient computational power available to carry out the quality enhancement signal processing.

At a second time period, e.g. when the device is idle, so that there is sufficient computational power available to carry out the quality enhancement signal processing, or e.g., when the connected to a second device 1213 that provides electric power sufficient for carrying out the quality enhancement processing, the desired quality enhancement signal processing is executed. The processed data is stored in the storage device 1207 of the portable device 1203.

The unprocessed media data is in some embodiments stored in the portable device, and in others is stored in a storage device 1217 in the second device 1213 that also includes a processor 1215 and sent to the portable device 1203 when connected to the second device 1213.

The portable device 1203 can then render the media data that has been pre-processed, or process and render the media data in real time with the aid of the helper data. The resulting media can then be presented based on customized signal processing for playback in the previously captured playback scenario.

As an example, consider again the case of a user who routinely uses their portable device on a train while commuting. One may wish to modify the audio to improve the subjective impression when listening in this noisy environment. Loudness-based noise compensation may be able to achieve this. The train noise is measured and saved along with the current user settings as metadata. Later, when the user returns home the portable device becomes connected to a media server, e.g., a personal computer or other device that which provides both electric power and also access to a library of media data. Selected media is processed using the captured metadata and environmental quantities to, in one version, generate and store processing media data based on the noise estimate and device settings. The next time the user is on the train, the user can play back audio that has been processed according to the environment to provide custom noise compensation.

In another version, the audio data is in the portable device in unprocessed form. During the second time period, helper data is generated, e.g., a set of time varying media-dependent gains to apply. The next time the user is on the train, the user can process the media according to the helper data possibly with one or more elements of the metadata and play back audio that has been processed according to the environment to provide custom noise compensation.

It would be clear to those in the art that different types of quality enhancement processing can additionally or instead be applied in similar manner to different audio media data, and other types of quality enhancement processing can be applied in similar manner to different to video media data. How to adapt the embodiments described herein to such other types of data and/or quality enhancement signal processing would be clear and relatively straightforward to those in the art from the description herein, together with knowledge of the quality enhancement signal processing.

Some Details on Perceptual Loudness Domain Quality Enhancement Audio Processing Methods Overview: Perceptual Domain-Based Quality Enhancement Processing The present invention is not limited to any particular types of quality enhancement processing of media data. However, to demonstrate advantageous use of embodiments of the invention, examples of some audio quality enhancement signal processing methods that occur in what is called the perceptual loudness domain are described in this section in more detail that above. It is known to determine and use in quality enhancement signal processing a measure of perceived loudness in a perceptual domain. See for example, International Patent Application No. PCT/US2004/016964, published as WO 2004111994, titled METHOD, APPARATUS, AND COMPUTER PROGRAM FOR CALCULATING AND ADJUSTING THE PERCEIVED LOUDNESS OF AN AUDIO SIGNAL and International Patent Application No. PCT/US2005/038579 published as WO 2006047600 titled CALCULATING AND ADJUSTING THE PERCEIVED LOUDNESS AND/OR THE PERCEIVED SPECTRAL BALANCE OF AN AUDIO SIGNAL. See also International Patent Application No. PCT/US20075/007946 published as WO 2007120453 titled CALCULATING AND ADJUSTING THE PERCEIVED LOUDNESS AND/OR THE PERCEIVED SPECTRAL BALANCE OF AN AUDIO SIGNAL. Each of these applications designates the United States. The contents of each of such publications WO 2004111994, WO 2006047600 and WO 2007120453 are incorporated herein by reference. See also Alan Seefeldt: "Loudness Domain Signal Processing," paper 7180, *Proceedings,* 123rd *Convention of the Audio Engineering Society*, New York, N.Y., USA, 5-8 Oct. 2007. Details of some of the audio quality enhancement signal processing methods described herein are in such published patent applications and the published paper.

The quality enhancement signal processing methods include determining modification parameters from calculations carried out in a perceptual loudness domain, and modifying audio media data according to the modification parameters. By determining the modification parameters in the perceptual loudness domain, greater control over perceptual loudness and perceived spectral balance may be achieved than if such modification parameters were derived in the electrical signal domain. In addition, the use of a basilar-membrane simulating psychoacoustic filterbank or its equivalent in performing loudness domain calculations may provide a more detailed control of the perceived spectrum than in arrangements that derive modification parameters in the electrical signal domain.

Throughout the description below, terms such as "filter" or "filterbank" are used to include essentially any form of recursive and non-recursive filtering such as infinite impulse response (IIR) filters or transforms, and finite impulse response (FIR) filters. By "filtered" information is meant the result of applying such filter or filters. Embodiments described below employ filterbanks implemented by transforms.

As described above, audio quality enhancement signal processing operations in a perceptual loudness domain that can beneficially be included in embodiments of the present invention include volume control, volume leveling, including dynamic range control and automatic gain control, dynamic equalization (DEQ), and noise compensation, including leveling in the presence of noise interference.

Such embodiments include determining the specific loudness of an audio signal, and, in the case that environmental noise quantities are included, determining the specific loudness of noise. The quality enhancement signal processing may include controlling the specific loudness of an audio signal by modifying audio data that includes an audio signal in order to reduce the difference between its specific loudness and a target specific loudness. For the case of a noisy background, processing method embodiments include receiving a measure of the noise from one or more sensors located at the resource limited device to measure noise quantities in the environment of the resource limited device, and controlling the partial specific loudness of an audio signal by modifying the audio signal in order to reduce the difference between its partial specific loudness and a target specific loudness. The quality enhancement signal processing may include processing an audio signal by processing the audio signal or a measure thereof in accordance with one or more processes and one or more process-controlling parameters to produce a signal having a target specific loudness.

The target specific loudness may be a function of the audio signal, or not a function of the audio signal. In the latter case, the target specific loudness may be a stored target specific loudness or a target specific loudness received as a parameter, or determined from a received parameter. In such cases, the modifying or the deriving may explicitly or implicitly calculate specific loudness or partial specific loudness. Examples of implicit calculation include, a lookup table or a by calculating a mathematical expression, in which specific loudness and/or partial specific loudness is inherently determined.

A Feed-Forward Arrangement

Figure 13A:
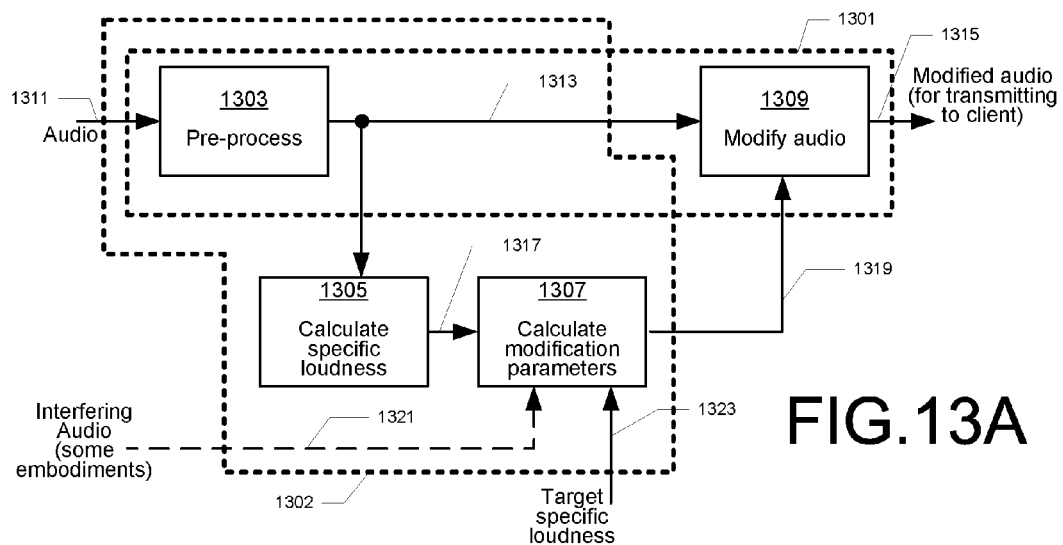
FIGS. 13A-13D show functional block diagrams describing some embodiments of the quality enhancement signal processing in which an audio signal is modified to generate modified audio such that the specific loudness is made close to a target specific loudness using a feed-forward arrangement.

FIGS. 13A-D show functional block diagrams describing some embodiments of the quality enhancement signal processing in which an audio signal is modified to generate modified audio such that the specific loudness is made close to a target specific loudness using a feed-forward arrangement. In particular, FIG. 13A shows a feed-forward topology in which an audio signal 1311 is applied to two paths: a signal modifying path 1301 having one or more processes or devices configured to modify the audio signal 1311 in response to one or more modification parameters 1319, and a parameter generation control path having a the parameter generation control path 1302 configured to generate such modification parameters 1319. The signal modifying path 1301 in the FIG. 13A feed-forward topology example may be a device or process that modifies the audio signal, for example, its amplitude, in a frequency-varying and/or time-varying mariner in accordance with modification parameters 1319 received from the parameter generation control path 1302. In one embodiment, the parameter generation control path 1302 operates at least partly in the perceptual loudness domain, while the signal modifying path 1301 operates in the electrical signal domain and produces a modified audio signal 1315.

The signal modifying path 1301 and the parameter generation control path 1302 together are configured to modify the audio signal to reduce the difference between its specific loudness and a target specific loudness 1323.

In one embodiment, each of the signal modifying path 1301 and the parameter generation control path 1302 processes a signal that has first been processed by a pre-processing operation or device. Thus, FIG. 13A, includes a pre-processing functional block 1303 that produces pre-processed audio 1313.

In the FIG. 13A feed-forward example, the parameter generation control path 1302 may include several processes and/or devices: In FIG. 13A, the parameter generation control path 1302 includes a calculate specific loudness block 1305 that includes one or more processes and/or devices configured to calculates the specific loudness 1317 of the audio signal in response, in general, to the audio signal 1311, or a measure of the audio signals, and in the example embodiment shown, in response to the pre-processed audio signal 1313. The parameter generation control path 1302 includes a calculate modification parameters block 1307 that calculates the modification parameters in response to the specific loudness 1317 and the target specific loudness 1323.

Figure 13B:
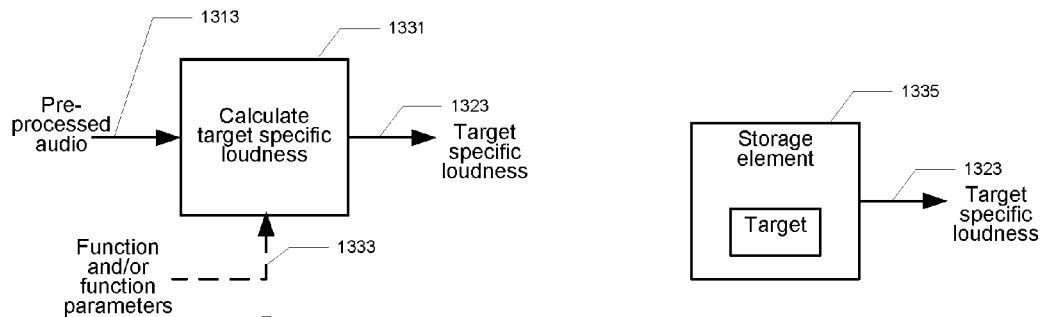

In some embodiments, as shown in FIG. 13B, the target specific loudness for the calculate modification parameters block 1307 of control path 1302 is determined by a target specific loudness block 1331 that includes one or more processes or devices configured to calculate the target specific loudness 1323 in response to, in general, the audio signal or a measure thereof, and in the embodiment shown, the pre-processed audio signal 1313. Such calculate target specific loudness block 1331 may perform one or more functions "F", each of which may have function parameters. For example, it may calculate the specific loudness of the audio signal and then apply one or more functions F to it to provide a target specific loudness 1323. This is indicated schematically in FIG. 13A as "Function and/or function parameter" input 1333 to the calculate target specific loudness block 1331.

Figure 13C:
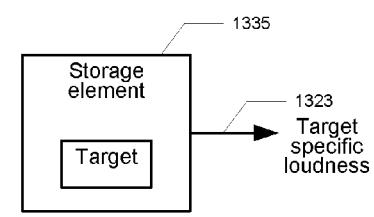

In some embodiments, as shown in FIG. 13C, the target specific loudness 1323 may be provided by a storing process or device, shown schematically as a storage element 1335, included in or associated with the parameter generation control path 1302.

Figure 13D:
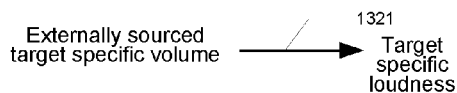

Furthermore, as shown in FIG. 13D, in some embodiments, the target specific loudness 1323 is provided by a source external to the overall process or device.

Thus, the modification parameters 1319 are based at least in part on calculations in the perceptual (psychoacoustic) loudness domain.

The calculations performed by processes or devices 1305 and 1307 in the FIG. 13A example, and 1331 in FIG. 13B may be performed explicitly and/or implicitly. Examples of implicit performance include (1) a lookup table whose entries are based in whole or in part on specific loudness and/or target specific loudness 1323 and/or modification parameter calculations, and (2) a closed-form mathematical expression that is inherently based in whole or in part on specific loudness and/or target specific loudness 1323 and/or modification parameters.

Although the calculation blocks 1305, 1307, and 1331 of the FIG. 13A and FIG. 13B examples are shown schematically and described as separate, this is for purposes of explanation only. It will be understood that one or more or all of these processes or devices may be combined in a single process or device or combined variously in multiple processes or devices.

The target specific loudness may be a scaling of a measure of the audio signal, such as the specific loudness of the audio signal. For example, as described in detail in WO 2006047600 and WO 2007120453, the scaling may be one or a combination of the following scalings of the specific loudness, in which b denotes a measure of frequency, e.g., a band number in the case the pre-processing 1303 divides the input signal into a plurality of frequency bands, t denoted a measure of time, Ñ[b, t] denoted the target specific loudness 1323, and N[b, t] denotes the specific loudness 1317 of the audio signal 1311:

(a) A time- and frequency-varying scale factor Ξ[b,t] scaling of the specific loudness as in the relationship Ñ[b,t] =ν[b,t]N[b,t].

(b) A time-varying, frequency-invariant scale factor Φ[t] scaling of the specific loudness as in the relationship Ñ[b, t]=Φ[t]N[b, t].

(c) A time-invariant, frequency-varying scale factor Θ[b] scaling of the specific loudness as in the relationship Ñ[b,t]=Θ[b]N[b,t].

(d) A time-invariant, frequency-invariant, scale factor α scaling of the specific loudness of the audio signal as in the relationship Ñ[b,t]=αN[b,t].

Thus, the target specific loudness 1323 denoted Ñ[b,t] may be expressed as one or more functions, denoted in combination by F of the audio signal or a measure of the audio signal, with the specific loudness N[b,t] being one possible measure of the audio signal, so that Ñ[b,t]=F(N[b,t]). Provided that the function or functions F is invertible, the specific loudness N[b,t] of the unmodified audio signal 1311 may be calculated as the inverse function or functions $F^{-1}$(N[b,t]) of the target specific loudness 1323.

While a feed-forward arrangement is shown in FIG. 13A, is it also known to use feedback and hybrid feed-forward/feedback arrangements in which the inverse function or functions $F^{-1}$( ) is calculated. See, for example, WO 2006047600 and WO 2007120453. However, for the sake of brevity of exposition, only the feed-forward configuration is described herein.

Whether using a lookup table, a closed-form mathematical expression, or some other technique, the operation of the parameter generation control path 1302 is such that the calculations are based in the perceptual (psychoacoustic) loudness domain even though specific loudness and target specific loudness 1323 may not be explicitly calculated. Either there is an explicit specific loudness or there is a notional, implicit specific loudness. Similarly, either there is an explicit target specific loudness 1323 or there is a notional, implicit target specific loudness 1323. In any case, the calculation of modification parameters seeks to generate modification parameters that modify the audio signal to reduce the difference between specific loudness and a target specific loudness 1323.

In a playback environment having a secondary interfering audio signal 1321, such as noise, the calculate modification parameters block 1307 also receives in some embodiments as input a measure of such a secondary interfering audio signal or the secondary interfering signal itself as one of its inputs. This input is shown as a broken line to indicate it is not in all embodiments. The measure of a secondary interfering signal may be its excitation, as described in more detail herein below and in WO 2006047600 and WO 2007120453. The application of a measure of the interfering signal or the signal itself to the calculate modification parameters block 1307 in FIG. 13A permits a suitably configured such process or device to calculate modification parameters 1319 that take the interfering signal into account to achieve noise compensation. In the FIG. 13A feed-forward example, partial specific loudness is not explicitly calculated—the calculate modification parameters block 1307 of FIG. 13A calculates the appropriate modification parameters to make the partial specific loudness of the modified audio approximate the target specific loudness 1323. In feedback and hybrid configurations, a partial specific loudness also may be calculated.

The modification parameters 1319, when applied to the audio signal (or pre-processed audio signal) by the signal modifying path 1301, reduce the difference between the specific loudness or the partial specific loudness of the resulting modified audio and the target specific loudness 1323. Ideally, the specific loudness of the modified audio signal 1315 closely approximates or is the same as the target specific loudness 1323.

In some embodiments, the pre-processing divides the audio signal to a plurality of frequency bands, e.g., using a filterbank. In such embodiments, the modification parameters 1319 may, as in the example described in more detail below, take the form of time-varying gain factors applied to the frequency bands derived from a filterbank in 1303. In alternate embodiments, the modification parameters 1319 are applied to the coefficients of a time-varying filter. Accordingly, in all of the FIG. 13A examples, signal modifying path 1301 may be implemented as, for example, a plurality of amplitude scalers, each operating in a frequency band, or a time-varying filter, e.g., a multitapped FIR filter or a multipole IIR filter.

Although not critical or essential to how specific loudness is determined, some embodiments use in calculating specific loudness block 1305 techniques set forth in above-mentioned International Application publication WO 2004/111964, wherein the calculating selects, from a group of two or more specific loudness model functions, one or a combination of two or more of the specific loudness model functions, the selection of which is controlled by the measure of characteristics of the input audio signal.

In accordance with further aspects of the invention, the unmodified audio signal 1311 and either (1) the modification parameters 1319 or (2) the target specific loudness 1323 or a representation of the target specific loudness 1323, e.g., scale factors usable in calculating, explicitly or implicitly, target specific loudness 1323, may be stored or transmitted for use, for example, in a temporally and/or spatially separated device or process. The modification parameters, target specific loudness 1323, or representation of the target specific loudness 1323 may be determined in any suitable way. In practice, a feed-forward arrangement, such as in the example of FIG. 13A, is the least complex and fastest inasmuch as it avoids calculations based on the modified audio signal 1315.

Figure 14:
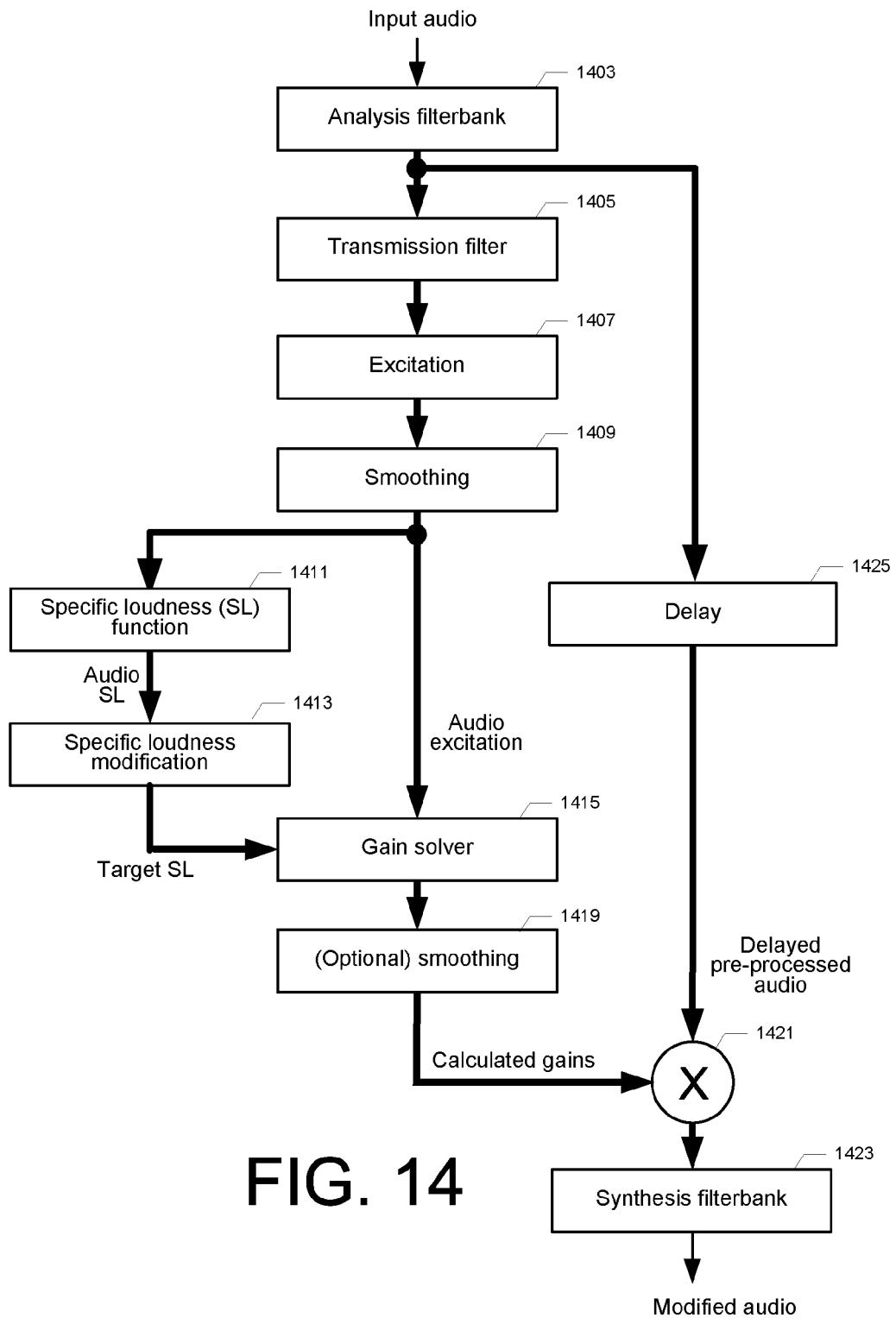
FIG. 14 depicts an example embodiment of an aspect of the invention embodied in a feed-forward arrangement in which the pre-processing separates the input audio into frequency bands.

FIG. 14 depicts greater details of an example embodiment of an aspect of the invention embodied in a feed-forward arrangement in which the pre-processing separates the input audio into frequency bands. In practical embodiments, the processing of the audio is carried out in the digital domain, so that sampling and digitizing of analog signals is carried out. Such details are left out of this description, and would be clear to those in the art.

The Audio 1311 first passes through an analysis filterbank function or device 1403, which splits the audio signal into a plurality of frequency bands. This is the pre-process 1303 for this example embodiment. Thick lines in FIG. 14 indicate multiple signals, so that there are multiple outputs, each a frequency band from analysis filterbank 1403. Each of these frequency bands undergoes the various processing steps shown, up to a synthesis filterbank 1423, which sums the bands to a combined wideband signal to generate the modified audio signal 1315.

The response of the filter associated with each frequency band in the analysis filterbank 1403 is designed to simulate the response at a particular location of the basilar membrane in the inner ear of a human. In some embodiments, analysis filterbank 1403 includes a set of linear filters whose bandwidth and spacing are constant on the equivalent rectangular bandwidth (ERB) frequency scale.

Analysis filterbank 1403 may be implemented efficiently through use of the short-time discrete Fourier transform (short-time DFT, STDFT) or the modified discrete cosine transform (modified DCT, MDCT). The STDFT or MDCT may be used similarly to implement synthesis filterbank 1423.

The output of each filter in the analysis filterbank 1403 next passes into a transmission filter function or device 1405 that is designed to simulate the filtering effect of the transmission of audio through the outer and middle ear of a human.

In order to compute the loudness of the input audio signal, a measure of the audio signals' short-time energy in each filter of the analysis filterbank 1403 after application of the transmission filter 1405 is obtained. This time and frequency varying measure is referred to as the excitation, denoted $E[b,t]$, where b denotes the frequency band, and t denotes time. To obtain the excitation, the outputs of transmission filter 1405 next pass into an excitation function or device 1407, the outputs of which are designed to simulate the distribution of energy along the basilar membrane of a human ear. Depending on the desired effects, the excitation energy values may be smoothed across time by a smoothing function or device 1409 that are designed to have time constants set in accordance with the requirements of the desired effects of the processing. The output of excitation function 1407 is a frequency domain representation of energy denoted E in respective ERB bands denoted b per time denoted t.

A specific loudness function or device 1411 converts the smoothed excitation signals into specific loudness in specific loudness (SL). Specific loudness may be represented, e.g., in units of sone per unit frequency, e.g., sone per ERB. Note that from the specific loudness, the overall or total loudness is the sum of the specific loudness across all bands b. Designing the specific loudness function 1411 includes determining gains for narrowband and wideband estimated values chosen to match experimental data on the growth of loudness for tones and noise. Furthermore, the specific loudness function 1411 is designed such that the specific loudness is some small value instead of zero when the excitation is at the threshold of hearing, and such that the specific loudness decreases monotonically to zero as the excitation decreases to zero. The conversion of excitation $E[b,t]$ to specific loudness denoted $N[b,t]$ is by a function denoted herein by $\Psi\{\cdot\}$, so that the specific loudness denoted $N[b,t]=\Psi\{E[b,t]\}$.

Depending on the particular desired effect or effects of the processing, the specific loudness components associated with the frequency bands are passed into a specific loudness modification function or device 1413 that generates a target specific loudness. As described above with reference to FIG. 13B, the target specific loudness in some embodiments, is a function of the input audio's specific loudness, according to the desired effect of the processing. A target specific loudness, for example, may be calculated using a scale factor the case of volume control. For the case of automatic gain control (AGC), or for the case of dynamic range control (DRC), a target specific loudness may be calculated using a ratio of desired output loudness to input loudness. One embodiment includes rather than performing DRC dependently on every band, smoothing specific loudness denoted $N[b,t]$ across bands so that the amount of DRC applied from one band to the next does not vary as drastically.

In the case of dynamic equalization (DEQ), a target specific loudness may be calculated using a relationship that takes into account the current spectrum of the audio, in particular, the spectrum of the signal is measured and the signal is then dynamically modified in order to transform the measured spectrum into an essentially static desired shape, specified across bands b and referred to as $EQ[b]$. The spectral shape of the audio signal is denoted by $L[b,t]$, and in one embodiment, is determined as a smoothing of the specific loudness, denoted $N[b,t]$ across time. As with the multiband DRC, one may not want the DEQ modification to vary drastically from one band to the next, and therefore a band-smoothing function may be applied to generate a band-smoothed spectrum. In order to preserve the original dynamic range of the audio, the desired spectrum $EQ[b]$ should be normalized to have the same overall loudness as the measured spectral shape given by $L[b,t]$. In one embodiment, a parameter is specified, e.g., a parameter that varies from 0 to 1 that expresses the amount of DEQ that is to be applied, with a value 0 indicating no DEQ.

Thus SL modification 1413 may operate independently on each band, or there may exist interdependence between or among bands.

Taking as its inputs the smoothed excitation frequency band components from smoother 1409 and the target specific loudness 1323 from the SL modification 1413, a gain solver function or device 1415 is configured to determine the gains that needs to be applied to each band in order to transform the determined specific loudness $N[b,t]$ into the target specific loudness 1323. The gains determined are in general frequency- and time-varying gains, which, when applied to the original excitation, result in a specific loudness that, ideally, is equal to the desired target specific loudness, and in practice results in modifying the audio signal in order to reduce the difference between its specific loudness and the target specific loudness. The gain solver 1415 may be implemented in various ways. If a closed form calculations is possible, it is applied. If a table lookup is possible, such a method also may be used. In one embodiment, the gain solver may include an iterative process in which, for each iteration, a specific loudness is evaluated using a current estimate of the gains. The resulting specific loudness is compared with the desired target and the gains are iteratively updated based on the error. Such an iterative method is disclosed in above-mentioned international patent application published as WO 2004111964. Other methods for computing the modification parameters through either explicit or implicit computation of the specific loudness and target specific loudness may be devised, and this invention is intended to cover all such methods.

The gains per band generated by the gain solver 1415 may be smoothed further over time by optional smoothing function or device 1419 in order to minimize perceptual artifacts. It may alternately be advantageous that temporal smoothing be applied elsewhere in the overall process or device.

Finally, the gains determined by gain solver 1415 are applied to respective bands through a respective multiplicative combining function or combiner 1421 that applies the gains to the outputs from the analysis filterbank delayed by a suitable delay function or device 1425 configured to compensate for any latency associated with the gain computation.

The modified audio 1315 is synthesized from the gain-modified bands in a synthesis filterbank function or device 1423. As described above, analysis filterbank 1403 may be implemented efficiently through use of the short-time DFT or the modified DCT, and the STDFT or MDCT may be used similarly to implement synthesis filterbank 1423. The synthesis filters for the bands are determined from the filters used in analysis filterbank 1403 and the delay of delay 1425.

Note that alternatively, instead of calculating gains for use in applying gain modifications in frequency bands, the gain solvers 1415 may calculate filter coefficients that control a time-varying filter, such as a multitapped FIR filter or a multipole IIR filter. For simplicity in exposition, aspects of the invention are mainly described as employing gain factors applied to frequency bands, it being understood that filter coefficients and time-varying filters may also be used in practical embodiments.

For noise compensation, the gains denoted G[b,t] from the gain solver are such that the specific loudness of the processed audio in the presence of the interfering noise is equal to or close to the target specific loudness. To achieve this effect, one may use the concept of partial loudness. Denote by $E_N[b,t]$ represent the excitation from the noise and denote by $E_A[b,t]$ the excitation from the audio with no noise preset. The combined specific loudness of the audio and the noise is given by $$N_{Tot}[b,t] = \Psi\{E_A[b,t] + E_N[b,t]\},$$

where, again, $\Psi\{\bullet\}$ denotes transformation from excitation to specific loudness. One may assume that a listener's hearing partitions the combined specific loudness between the partial specific loudness of the audio and the partial specific loudness of the noise in a way that preserves the combined specific loudness, where the partial specific loudness of the audio, denoted $N_A[b,t]$, is the value one wishes to control, and therefore one must solve for this value. WO 2006047600 AND WO 2007120453 describes how the partial specific loudness of the noise may be approximated from $E_N[b,t]$, $N_{Tot}[b,t]$, a masked threshold in the presence of the noise, and the threshold of hearing in quiet at band b, one then can arrive at an expression for the partial specific loudness of the audio $N_A[b,t]$, with the property that when the excitation of the audio is equal to the mask threshold of the noise, the partial specific loudness of the audio is equal to the loudness of a signal at the threshold in quiet, and when the excitation of the audio is much greater than that of the noise, the specific loudness of the audio is approximately equal to what it would be if the noise were not present. In other words, as the audio becomes much louder than the noise, the noise is masked by the audio. The expression includes an exponent value that can be chosen empirically to give a good fit to data on the loudness of a tone in noise as a function of the signal-to-noise ratio. The masked threshold of the noise may be approximated as a function of the noise excitation itself.

For noise compensation, a modified gain solver is used to calculate the gains G[b, t] such that the partial specific loudness of the processed audio in the presence of the noise is equal to the target specific loudness.

Figure 15:
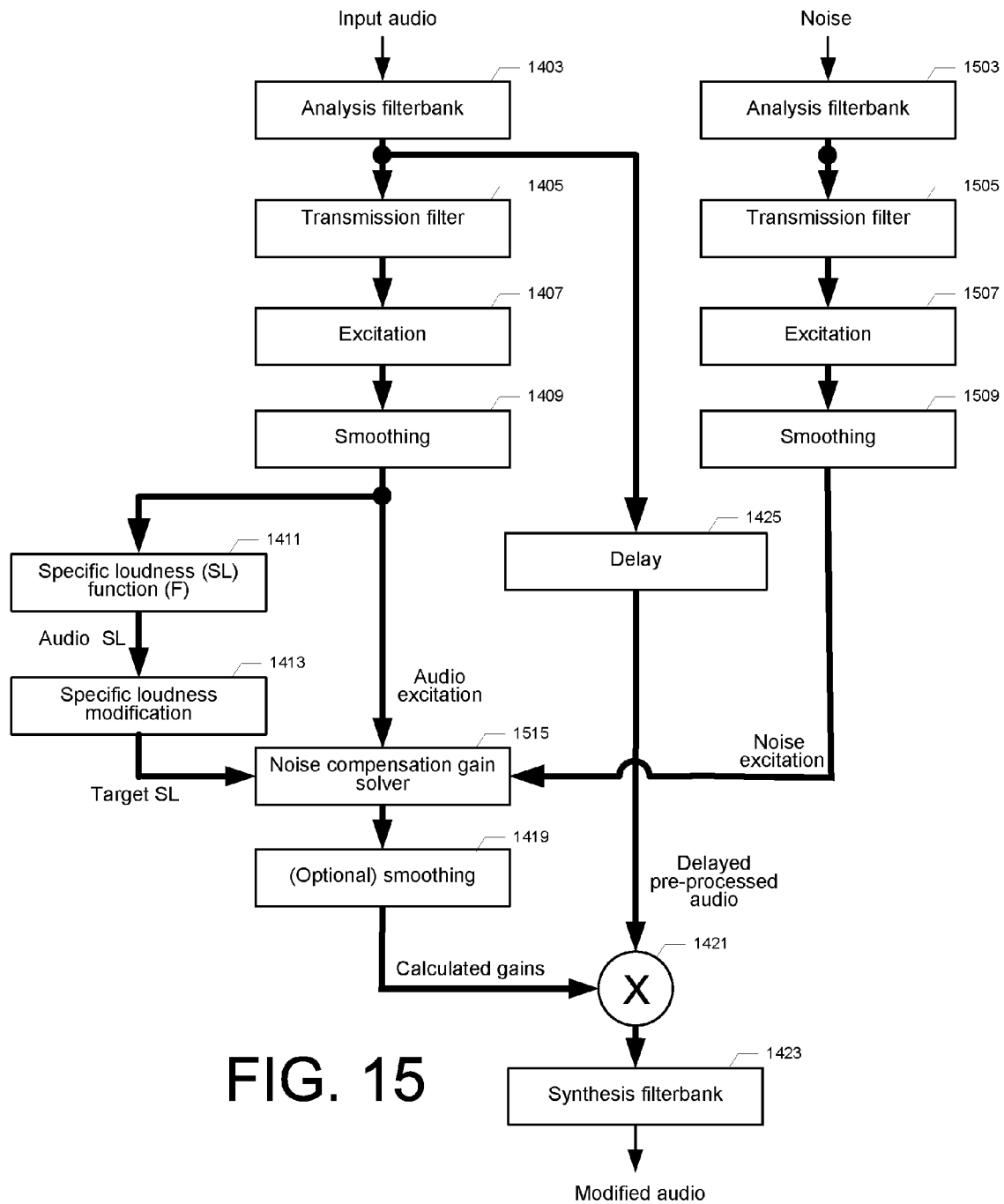
FIG. 15 depicts a functional block diagram of an example embodiment of noise compensation in a feed-forward arrangement.

FIG. 15 depicts a functional block diagram of an example embodiment of noise compensation un in a feed-forward arrangement. In FIG. 15, the original gain solver 1415 of FIG. 14 is replaced by a noise compensating gain solver 1515. In addition, the FIG. 15 includes measurement of the noise excitation by an analysis filterbank 1503, transmission filter 1505, excitation 1507 and smoothing 1509 in a manner corresponding to the operation of blocks 1403, 1405, 1407 and 1409 that feeds into the gain solver 1515 along with the excitation of the audio from smoothing 1409 and the target specific loudness from SL modification 1413.

In its most basic mode of operation, the SL modification 1413 in FIG. 15 may simply set the target specific loudness equal to the original specific loudness of the audio N[b,t]. In other words, the SL modification provides a frequency-invariant, scale factor scaling of the specific loudness of the audio signal. With an arrangement such as in FIG. 15, the gains are calculated so that the perceived loudness spectrum of the processed audio in the presence of the noise is equal to the loudness spectrum of the audio in the absence of the noise. Additionally, any one or combination of ones of the previously described techniques for computing the target specific loudness as a function of the original, including volume control, AGC, DRC, and DEQ, may be used in conjunction with the noise compensating loudness modification system.

In a practical embodiment, the measurement of the noise may be obtained from a microphone placed in or near the environment into which the audio will be played. One aspect of the invention is that the measurement the noise is carried out at the resource limited device, but the processing, being processing power and/or battery power intensive, is carried out in an element upstream from the resource limited device.

Alternatively, a predetermined set of template noise excitations may be utilized that approximate the anticipated noise spectrum under various conditions. For example, the noise in an automobile cabin may be pre-analyzed at various driving speeds and then stored as a look-up table of noise excitation versus speed. The noise excitation fed into the gain solver 1515 in FIG. 15 may then be approximated from this look-up table as the speed of the automobile varies.

Comparing FIGS. 13A-13B to FIG. 14 and FIG. 15, the pre-process block 1303 is carried out by analysis filterbank 1403, the modify audio is carried out by the combination of the delay 1425, and the gain multiplication 1421, and the synthesis filterbank. The calculate specific loudness block 1305 is carried out by the combination of transmission filter 1405, excitation 1407, smoothing 1409, and specific loudness function 1411. The calculate modification parameters calculates the gains G(b,t) and is carried out by gain solver 1415 optionally in combination with the smoothing 1419 in the case of no noise compensation, and gain solver 1415 in combination with analysis filterbank 1503, transmission filter 1505, excitation 1507, smoothing 1509, and specific loudness function 1511, and optionally in combination with the smoothing 1419. For the various applications, the calculate target specific loudness 1331 if FIG. 13B is carried out by specific loudness modification block 1413.

While one or more of volume control, AGC, dynamic range control, dynamic equalization, and noise compensation are described in some detail herein, this is not meant in any way to limit the type of signal processing that the invention is limited to. The invention is applicable to signal processing operations on media data that can advantageously be carried out in the upstream, i.e., when or where one or more resources sufficient for the processing are available, based on information accepted from a resource constrained device related to the processing of the media data for rendering by the resource constrained device, such that the processed output is usable by the resource constrained device to render or to process and render the media data.

While noise compensation possibly with one or more of volume control, AGC, dynamic range control, and/or dynamic equalization is described in some detail herein, this is not meant in any way to limit the type of signal processing that the invention is limited to. The invention is applicable to signal processing operations on media data that can advantageously be carried out in the upstream at a network element where one or more resources sufficient for the processing are available using information that is related to the environment of a resource limited device, but obtained remotely from the resource limited device, to generate processed output that is usable by the resource constrained device to render or to process and render the media data.

Note that while the above description and patent application publications WO 2004111994 and WO 2006047600 describe some methods of determining the specific loudness, other method also are known for determining the specific loudness. See, for example, WO 2007120453.

In one embodiment, a computer-readable medium is configured with program logic, e.g., a set of instructions that when executed by at least one processor, causes carrying out a set of method steps of methods described herein.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device" "portable device" and "resource constrained device" may be used interchangeably to describe any of those multiple other electronic devices, which the capability of rendering media data. However, the scope of the invention is not limited to devices that are labeled with those terms.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include at least one processor.

Note that when a method is described that includes several elements, e.g., several steps, no ordering of such elements, e.g., ordering of steps is implied, unless specifically stated.

The methodologies described herein are, in one embodiment, performable by one or more processors that accept computer-executable (also called machine-executable) program logic embodied on one or more computer-readable media. The program logic includes a set of instructions that when executed by one or more of the processors carry out at least one of the methods described herein. Any processor capable of executing a set of instructions (sequential or otherwise) that specify actions to be taken are included. Thus, one example is a typical processing system that includes one processor or more than processors. Each processor may include one or more of a CPU, a graphics processing unit, and a programmable DSP unit. The processing system further may include a storage subsystem that includes a memory subsystem including main RAM and/or a static RAM, and/or ROM. The storage subsystem may further include one or more other storage devices. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The terms storage device, storage subsystem, etc., unit as used herein, if clear from the context and unless explicitly stated otherwise, also encompasses a storage device such as a disk drive unit. The processing system in some configurations may include a sound output device, and a network interface device. The storage subsystem thus includes a computer-readable medium that carries program logic (e.g., software) including a set of instructions to cause performing, when executed by one or more processors, one of more of the methods described herein. The program logic may reside in a hard disk, or may also reside, completely or at least partially, within the RAM and/or within the processor during execution thereof by the processing system. Thus, the memory and the processor also constitute computer-readable medium on which is encoded program logic, e.g., in the form of instructions.

Furthermore, a computer-readable medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable medium configured with a set of instructions, e.g., a computer program that are for execution on one or more processors, e.g., one or more processors that are part of signal processing apparatus. Thus, as will be appreciated by those skilled in the art, embodiments of the present invention may be embodied as a method, an apparatus such as a special purpose apparatus, an apparatus such as a data processing system, or a computer-readable medium, e.g., a computer program product. The computer-readable medium has therein logic including a set of instructions that when executed on one or more processors cause carrying out method steps. Accordingly, aspects of the present invention may take the form of a method, an entirely hardware embodiment, an entirely software embodiment or an embodiment combining software and hardware aspects. Furthermore, the present invention may take the form of program logic, e.g., in a computer readable medium, e.g., a computer program on a computer-readable storage medium, or the computer readable medium configured with computer-readable program code, e.g., a computer program product.

While the computer readable medium is shown in an example embodiment to be a single medium, the term "medium" should be taken to include a single medium or multiple media (e.g., a centralized or distributed database, and/or associated caches and servers) that store the one or more sets of instructions. The term "computer readable medium" shall also be taken to include any computer readable medium that is capable of storing, encoding or otherwise configured with a set of instructions for execution by one or more of the processors and that cause the carrying out of any one or more of the methodologies of the present invention. A computer readable medium may take many forms, including but not limited to non-volatile media and volatile media. Non-volatile media includes, for example, optical, magnetic disks, and magneto-optical disks. Volatile media includes dynamic memory, such as main memory.

It will be understood that the steps of methods discussed are performed in one embodiment by an appropriate processor (or processors) of a processing system (e.g., computer system) executing instructions stored in storage. It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of processing audio data for at least one of spatializing and loudness domain audio processing using processing hardware, the method comprising:
    receiving in the processing hardware audio data streamed from a battery operated and/or processing power limited audio playback device, the audio data being for rendering by the audio playback device;

accepting in the processing hardware metadata from the audio playback device related to one or both of the spatializing and the loudness domain audio processing of the audio data; and data processing the audio data in at least the processing hardware for at least one of spatializing and loudness domain audio processing using at least some of the accepted metadata to generate processed output, wherein the loudness domain audio processing comprises determining a measure of the specific loudness of the audio data, and wherein the spatializing comprises spatializing the audio data for playback by the audio playback device to provide a listener with the experience of listening to audio coming from a set of loudspeakers at a respective set of locations in a listening room, even if the listener is in fact listening to the audio media data with earphones, or with a simple set of stereo loudspeakers; and streaming processed audio data in the processed output from the processing hardware to the audio playback device for in real time playback by the audio playback device, wherein the processing hardware is external to the audio playback device, and wherein the metadata includes information obtained at the audio playback device, and includes a set of one or more parameters related to the at least one of spatializing and loudness domain audio processing of the media data or to the environment of the audio playback device, such that the audio data from the audio playback device is played back in real time on the audio playback device in at least one of spatialized form and loudness domain audio processed form.

2. A method as recited in claim 1, wherein the data processing uses at least one of the set of one or more parameters to generate processed output that includes processed audio for rendering by the audio playback device.

3. A method as recited in claim 2, wherein the data processing of the audio data is prior to rendering of the processed media data on the audio playback device.

4. A method as recited in claim 1, wherein some audio data processing occurs at the audio playback device, and wherein the processed output includes helper data for use by the audio playback device for the audio data processing that occurs at the audio playback device.

5. A method as recited in claim 2,
wherein the data processing of the audio data into generate processed audio data occurs where resources sufficient for the processing are available, and precedes rendering of the processed audio data on the audio playback device, and wherein the audio data includes one or more of:
audio data streamed or broadcast in real time to the audio playback device,
audio data interactively streamed across a network to the audio playback device as part of two-way communication with the audio playback device, and
audio data originating at or generated by audio playback device for rendering by the audio playback device.

6. A method as recited in claim 5, wherein the audio data includes audio data streamed or broadcast in real time to the audio playback device.

7. A method as recited in claim 5, wherein the audio data is at least one of: stored in the audio playback device and generated by the audio playback device, wherein the data processing uses at least one of the set of one or more parameters to generate processed output that includes processed audio for rendering by the audio playback device.

8. A method as recited in claim 1, wherein the data processing includes processing for loudness domain audio processing, including loudness leveling according to at least one of the set of one or more parameters.

9. A method as recited in claim 1,
wherein the set of one or more parameters include one or more loudness level parameters,
wherein the data processing includes loudness domain audio processing including:
loudness leveling according the one or more loudness level parameters, the loudness leveling including:
generating modification parameters using the loudness level parameters, wherein the modification parameters are generated by carrying out operations on information in a perceptual loudness domain, and
modifying the audio data based upon the modification parameters to generate processed audio data, and
wherein the one or more loudness level parameters include one or more of a reference reproduction level, a desired reproduction level and a leveling amount.

10. A method as recited in claim 9,
wherein the modifying of the audio data includes one or more of automatic gain control, dynamic range compression, and dynamic equalization.

11. A method as recited in claim 1,
wherein the data processing of the audio data includes processing for audio spatialization according to at least one of the set of one or more parameters.

12. A method as recited in claim 1,
wherein the data processing includes processing for loudness domain audio processing, and
wherein the set of one or more parameters includes one or more parameters related to the environment of the audio playback device.

13. A method as recited in claim 12,
wherein the set of one or more parameters includes one or more parameters related to the environment of the audio playback device, including at least one parameter indicative of an acoustic profile of noise in the environment, and
wherein the data processing includes processing for noise compensation.

14. A method as recited in claim 13,
wherein the set of one or more parameters includes one or more loudness level parameters,
wherein the noise compensation comprises:
generating modification parameters from the audio data using one or more loudness level parameters and the one or more parameters of the acoustic noise profile, the modification parameters being generated by carrying out operations on information in a perceptual loudness domain, and
modifying the audio data based upon the modification parameters to generate processed audio data, and
wherein the one or more than one loudness level parameters include:
one or more of whether audio noise compensation is turned on, a reference level for the audio playback device, a desired reproduction level, and a noise compensation amount.

15. A method as recited in claim 14, wherein the data processing of the audio data includes one or more of automatic gain control, dynamic range compression, and/or equalization applied to the audio data.

16. A tangible computer-readable storage medium configured with instructions that when executed by at least one processor of a processing system causes carrying a method of processing audio data for at least one of spatializing and loudness domain audio processing using processing hardware that includes the processing system, the method comprising:
 receiving in the processing hardware audio data streamed from a battery operated and/or processing power limited audio playback device, the audio data being for rendering by the audio playback device;
 accepting in the processing hardware metadata from the audio playback device related to one or both of the spatializing and the loudness domain audio processing of the audio data; and
 data processing the audio data in at least the processing hardware for at least one of spatializing and loudness domain audio processing using at least some of the accepted metadata to generate processed output, wherein the loudness domain audio processing comprises determining a measure of the specific loudness of the audio data, and wherein the spatializing comprises spatializing the audio data for playback by the audio playback device to provide a listener with the experience of listening to audio coming from a set of loudspeakers at a respective set of locations in a listening room, even if the listener is in fact listening to the audio media data with earphones, or with a simple set of stereo loudspeakers; and
 streaming processed audio data in the processed output from the processing hardware to the audio playback device for in real time playback by the audio playback device,
 wherein the processing hardware is external to the audio playback device, and
 wherein the metadata includes information obtained at the audio playback device, and includes a set of one or more parameters related to the at least one of spatializing and loudness domain audio processing of the media data or to the environment of the audio playback device,
 such that the audio data from the audio playback device is played back in real time on the audio playback device in at least one of spatialized form and loudness domain audio processed form.

17. A tangible computer-readable storage medium as recited in claim 16,
 wherein the processing hardware is external to the audio playback device, and
 wherein some audio data processing occurs at the audio playback device, and wherein the processed output includes helper data for use by the audio playback device for the audio data processing that occurs at the audio playback device.

18. A tangible computer-readable storage medium, as recited in claim 16,
 wherein the data processing of the audio data by the processing hardware into generate processed audio data precedes rendering of the processed audio data on the audio playback device, and
wherein the audio data includes one or more of:
 audio data streamed or broadcast in real time to the audio playback device,
 audio data interactively streamed across a network to the audio playback device as part of two-way communication with the audio playback device, and
 audio data originating at or generated by audio playback device for rendering by the audio playback device.

19. A tangible computer-readable storage medium as recited in claim 18, wherein the audio data includes audio data streamed or broadcast in real time to the audio playback device.

20. A tangible computer-readable storage medium as recited in claim 18, wherein the audio data is at least one of: stored in the audio playback device and generated by the audio playback device,
 wherein the data processing uses at least one parameter of the set of one or more parameters to generate processed output that includes processed audio for rendering by the audio playback device.

21. A tangible computer-readable storage medium, as recited in claim 16, wherein the data processing by the processing hardware includes processing for loudness domain audio processing, including loudness leveling according to at least one of the set of one or more parameters.

22. A tangible computer-readable storage medium as recited in claim 21, wherein the set of one or more parameters include one or more loudness level parameters,
 wherein the loudness leveling is according the one or more loudness level parameters, the loudness leveling including:
  generating modification parameters using the loudness level parameters, wherein the modification parameters are generated by carrying out operations on information in a perceptual loudness domain, and
  modifying the audio data based upon the modification parameters to generate processed audio data, and
 wherein the one or more loudness level parameters include one or more of a reference reproduction level, a desired reproduction level and a leveling amount, and
 wherein the modifying of the audio data includes one or more of: automatic gain control, dynamic range compression, and dynamic equalization.

23. A tangible computer-readable storage medium as recited in claim 16,
 wherein the data processing of the audio data includes processing for audio spatialization according to at least one parameter of the set of one or more parameters.

24. A tangible computer-readable storage medium as recited in claim 16,
 wherein the data processing includes processing for loudness domain audio processing, and
 wherein the set of one or more parameters includes one or more parameters related to the environment of the audio playback device.

25. A tangible computer-readable storage medium as recited in claim 24,
 wherein the set of one or more parameters includes one or more parameters related to the environment of the audio playback device, including at least one parameter indicative of an acoustic profile of noise in the environment, and
 wherein the data processing includes processing for noise compensation.

26. A system for carrying out at least part of one or more of spatializing and loudness domain audio processing of audio data, the apparatus comprising:
 an interface operative to connect to a battery operated and/or processing power limited audio playback device and to accept metadata from the audio playback device related to one or both of spatializing and loudness domain audio processing of audio data that is for rendering by the audio playback device;

processing hardware operative to receive audio data streamed from the audio playback device, and to carry out data processing of the received audio data for at least one of spatializing and loudness domain audio processing using at least some of the accepted metadata to generate processed output, wherein the loudness domain audio processing comprises determining a measure of the specific loudness of the audio data, and wherein the spatializing comprises spatializing the audio data for playback by the audio playback device to provide a listener with the experience of listening to audio coming from a set of loudspeakers at a respective set of locations in a listening room, even if the listener is in fact listening to the audio media data with earphones, or with a simple set of stereo loudspeakers; and hardware operative to stream processed audio data in the processed output to the audio playback device for real time playback by the audio playback device, wherein the metadata includes information obtained at the audio playback device, and includes a set of one or more parameters related to the at least one of spatializing and loudness domain audio processing of the audio data or to the environment of the audio playback device, such that the processed output audio data from the audio playback device is played back on the audio playback device in at least one of spatialized form and loudness domain audio processed form.

27. A system as recited in claim 26, wherein the processing hardware is external to the audio playback device, and wherein some audio data processing occurs at the audio playback device, and wherein the processed output includes helper data for use by the audio playback device for the audio data processing that occurs at the audio playback device.

28. A system, as recited in claim 26, wherein the data processing of the audio data by the processing hardware to generate processed audio data precedes rendering of the processed audio data on the audio playback device, and wherein the audio data includes one or more of:

audio data streamed or broadcast in real time to the audio playback device, audio data interactively streamed across a network to the audio playback device as part of two-way communication with the audio playback device, and audio data originating at or generated by audio playback device for rendering by the audio playback device.

29. A system as recited in claim 28, wherein the audio data includes audio data streamed or broadcast in real time to the audio playback device.

30. A system as recited in claim 28, wherein the audio data is at least one of: stored in the audio playback device and generated by the audio playback device, wherein the data processing uses at least one parameter of the set of one or more parameters to generate processed output that includes processed audio for rendering by the audio playback device.

31. A system, as recited in claim 26, wherein the data processing by the processing hardware includes processing for loudness domain audio processing, including loudness leveling according to at least one of the set of one or more parameters.

32. A system as recited in claim 31, wherein the set of one or more parameters include one or more loudness level parameters, wherein the loudness leveling is according the one or more loudness level parameters, the loudness leveling including:

generating modification parameters using the loudness level parameters, wherein the modification parameters are generated by carrying out operations on information in a perceptual loudness domain, and modifying the audio data based upon the modification parameters to generate processed audio data, and wherein the one or more loudness level parameters include one or more of a reference reproduction level, a desired reproduction level and a leveling amount, and wherein the modifying of the audio data includes one or more of automatic gain control, dynamic range compression, and dynamic equalization.

33. A system as recited in claim 26, wherein the data processing of the audio data includes processing for audio spatialization according to at least one parameter of the set of one or more parameters.

34. A system as recited in claim 26, wherein the data processing includes processing for loudness domain audio processing, and wherein the set of one or more parameters includes one or more parameters related to the environment of the audio playback device.

35. A system as recited in claim 34, wherein the set of one or more parameters includes one or more parameters related to the environment of the audio playback device, including at least one parameter indicative of an acoustic profile of noise in the environment, and wherein the data processing includes processing for noise compensation.

* * * * *